United States Patent
Sarkis et al.

(10) Patent No.: US 12,120,729 B2
(45) Date of Patent: Oct. 15, 2024

(54) TECHNIQUES FOR MULTIPLEXING SIDELINK FEEDBACK ON A HIGH PRIORITY PHYSICAL UPLINK SHARED CHANNEL

(71) Applicant: QUALCOMM Incorporated, San Diego, CA (US)

(72) Inventors: Gabi Sarkis, San Diego, CA (US); Seyedkianoush Hosseini, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 482 days.

(21) Appl. No.: 17/475,161

(22) Filed: Sep. 14, 2021

(65) Prior Publication Data

US 2023/0082996 A1    Mar. 16, 2023

(51) Int. Cl.
*H04W 72/566*   (2023.01)
*H04L 1/1867*   (2023.01)
*H04W 72/1268*  (2023.01)
*H04W 72/23*    (2023.01)

(52) U.S. Cl.
CPC ......... *H04W 72/569* (2023.01); *H04L 1/1896* (2013.01); *H04W 72/1268* (2013.01); *H04W 72/23* (2023.01)

(58) Field of Classification Search
CPC ............... H04W 72/569; H04W 72/23; H04W 72/1268; H04L 1/1896
See application file for complete search history.

(56) References Cited

U.S. PATENT DOCUMENTS

| | | | | |
|---|---|---|---|---|
| 11,252,753 | B2* | 2/2022 | Chen | H04L 1/1887 |
| 2018/0213549 | A1* | 7/2018 | Kim | H04L 5/0032 |
| 2018/0255532 | A1* | 9/2018 | Li | H04W 88/04 |
| 2021/0006318 | A1* | 1/2021 | Kim | H04L 1/1867 |
| 2021/0006376 | A1* | 1/2021 | Cirik | H04L 5/0094 |
| 2021/0028891 | A1* | 1/2021 | Zhou | H04W 4/40 |
| 2021/0050950 | A1* | 2/2021 | Zhou | H04W 76/14 |
| 2021/0050953 | A1* | 2/2021 | Park | H04B 7/0456 |
| 2021/0050954 | A1* | 2/2021 | Ryu | H04W 72/02 |
| 2021/0105126 | A1* | 4/2021 | Yi | H04L 1/1671 |
| 2022/0232525 | A1* | 7/2022 | Lee | H04L 5/0053 |
| 2022/0295509 | A1* | 9/2022 | Behravan | H04L 5/0053 |
| 2023/0050524 | A1* | 2/2023 | Lai | H04W 72/563 |

(Continued)

*Primary Examiner* — Jael M Ulysse
(74) *Attorney, Agent, or Firm* — Arun Swain

(57) ABSTRACT

Methods, systems, and devices for wireless communications are described. In some systems, a user equipment (UE) may receive scheduling information that schedules an uplink data message over a high priority physical uplink shared channel (PUSCH) that overlaps in time with a physical uplink control channel (PUCCH) resource over which the UE is scheduled to transmit feedback associated with sidelink communication. The UE may receive signaling from a base station indicating whether the feedback associated with the sidelink communication can be multiplexed with the uplink data message on the high priority PUSCH. As such, the UE may multiplex the feedback associated with the sidelink communication on the high priority PUSCH if the signaling from the base station indicates that the feedback associated with the sidelink communication can be multiplexed with the uplink data message on the high priority PUSCH.

30 Claims, 15 Drawing Sheets

(56) References Cited

U.S. PATENT DOCUMENTS

| | | | |
|---|---|---|---|
| 2023/0059550 A1* | 2/2023 | Yao | H04L 1/1854 |
| 2023/0171793 A1* | 6/2023 | Kim | H04L 5/0055 |
| | | | 370/329 |
| 2023/0246744 A1* | 8/2023 | Yoshioka | H04L 1/1671 |
| | | | 370/328 |
| 2023/0276462 A1* | 8/2023 | Hwang | H04W 4/46 |
| | | | 370/329 |
| 2023/0371061 A1* | 11/2023 | Hwang | H04W 72/56 |

\* cited by examiner

TECHNIQUES FOR MULTIPLEXING SIDELINK FEEDBACK ON A HIGH PRIORITY PHYSICAL UPLINK SHARED CHANNEL

FIELD OF TECHNOLOGY

The following relates to wireless communications, including techniques for multiplexing sidelink feedback on a high priority physical uplink shared channel (PUSCH).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a UE may transmit one or more control messages to a base station over a physical uplink control channel (PUCCH) and one or more data messages to the base station over a physical uplink shared channel (PUSCH). PUCCHs and PUSCHs may be associated with two different priorities, including high priority and low priority.

SUMMARY

The described techniques relate to improved methods, systems, devices, and apparatuses that support techniques for multiplexing sidelink feedback on a high priority physical uplink shared channel (PUSCH). Generally, the techniques described herein provide for a conditional multiplexing of feedback associated with sidelink communication with an uplink data message in scenarios in which a physical uplink control channel (PUCCH) resource over which a user equipment (UE) is originally scheduled to transmit the feedback associated with the sidelink communication at least partially overlaps in time with a high priority PUSCH resource over which the UE is scheduled to transmit the uplink data message. For example, the UE may perform sidelink communication with another UE and may receive, from a base station, scheduling information that results in the PUCCH resource over which the UE is to transmit the feedback associated with the sidelink communication at least partially overlapping in time with the high priority PUSCH resource over which the UE is to transmit the uplink data message.

In some examples, the UE may conditionally multiplex the feedback associated with the sidelink communication with the uplink data message based on a value of a parameter, an explicit indication from the base station, or one or more other multiplexing rules or procedures. In some implementations, for example, the UE may multiplex the feedback associated with the sidelink communication with the uplink data message if the value of the parameter satisfies a threshold value, if a control signal allocating the PUCCH resource for the feedback associated with the sidelink communication indicates that the feedback can be multiplexed with the uplink data message, or if the PUCCH resource also overlaps with a low priority PUSCH resource and satisfies one or more other multiplexing rules or procedures.

A method for wireless communication at a UE is described. The method may include receiving, from a base station, a first signal that schedules a first uplink data message associated with a first priority index, the first uplink data message at least partially overlapping in time with an uplink control channel resource for feedback associated with sidelink communication at the UE, obtaining a second signal that indicates whether the feedback associated with the sidelink communication can be multiplexed with the first uplink data message, and transmitting, to the base station, the first uplink data message in accordance with the second signal.

An apparatus for wireless communication at a UE is described. The apparatus may include a processor, memory coupled with the processor, and instructions stored in the memory. The instructions may be executable by the processor to cause the apparatus to receive, from a base station, a first signal that schedules a first uplink data message associated with a first priority index, the first uplink data message at least partially overlapping in time with an uplink control channel resource for feedback associated with sidelink communication at the UE, obtain a second signal that indicates whether the feedback associated with the sidelink communication can be multiplexed with the first uplink data message, and transmit, to the base station, the first uplink data message in accordance with the second signal.

Another apparatus for wireless communication at a UE is described. The apparatus may include means for receiving, from a base station, a first signal that schedules a first uplink data message associated with a first priority index, the first uplink data message at least partially overlapping in time with an uplink control channel resource for feedback associated with sidelink communication at the UE, means for obtaining a second signal that indicates whether the feedback associated with the sidelink communication can be multiplexed with the first uplink data message, and means for transmitting, to the base station, the first uplink data message in accordance with the second signal.

A non-transitory computer-readable medium storing code for wireless communication at a UE is described. The code may include instructions executable by a processor to receive, from a base station, a first signal that schedules a first uplink data message associated with a first priority index, the first uplink data message at least partially overlapping in time with an uplink control channel resource for feedback associated with sidelink communication at the UE, obtain a second signal that indicates whether the feedback associated with the sidelink communication can be multiplexed with the first uplink data message, and transmit, to the base station, the first uplink data message in accordance with the second signal.

In some examples of the method, apparatuses, and non-transitory computer-readable medium described herein, obtaining the second signal indicating whether the feedback associated with the sidelink communication can be multiplexed with the first uplink data message may include operations, features, means, or instructions for obtaining an indication of a parameter, where transmitting the first uplink data message may be based on whether a value of the parameter satisfies a threshold value.

Some examples of the method, apparatuses, and non-transitory computer-readable medium described herein may further include operations, features, means, or instructions for multiplexing the feedback associated with the sidelink communication with the first uplink data message based on the value of the parameter satisfying the threshold value, where transmitting the first uplink data message may be based on multiplexing the feedback associated with the sidelink communication with the first uplink data message.

Some examples of the method, apparatuses, and non-transitory computer-readable medium described herein may further include operations, features, means, or instructions for dropping the feedback associated with the sidelink communication based on the value of the parameter failing to satisfy the threshold value, where transmitting the first uplink data message may be based on dropping the feedback associated with the sidelink communication.

In some examples of the method, apparatuses, and non-transitory computer-readable medium described herein, the UE receives an indication of the threshold value from the base station or the threshold value may be standardly configured.

In some examples of the method, apparatuses, and non-transitory computer-readable medium described herein, the threshold value may be based on a service type or a latency constraint associated with the UE.

In some examples of the method, apparatuses, and non-transitory computer-readable medium described herein, obtaining the second signal indicating whether the feedback associated with the sidelink communication can be multiplexed with the first uplink data message may include operations, features, means, or instructions for receiving, from the base station, a control signal allocating the uplink control channel resource for the feedback associated with the sidelink communication, where the control signal indicates whether the feedback associated with the sidelink communication can be multiplexed with the first uplink data message.

In some examples of the method, apparatuses, and non-transitory computer-readable medium described herein, the control signal includes DCI signaling or RRC signaling.

In some examples of the method, apparatuses, and non-transitory computer-readable medium described herein, obtaining the second signal indicating whether the feedback associated with the sidelink communication can be multiplexed with the first uplink data message may include operations, features, means, or instructions for obtaining an indication that the feedback associated with the sidelink communication can be multiplexed with the first uplink data message. Some examples of the method, apparatuses, and non-transitory computer-readable medium described herein may further include operations, features, means, or instructions for receiving, from the base station, a third signal scheduling a second uplink data message associated with a second priority index having a lower priority than the first priority index, where the second uplink data message at least partially overlaps in time with the uplink control channel resource for the feedback associated with the sidelink communication, and where the feedback associated with the sidelink communication can be multiplexed with the second uplink data message, and transmitting, to the base station, the second uplink data message in accordance with a configured multiplexing procedure.

Some examples of the method, apparatuses, and non-transitory computer-readable medium described herein may further include operations, features, means, or instructions for multiplexing the feedback associated with the sidelink communication with one of the first uplink data message or the second uplink data message in accordance with the configured multiplexing procedure and based on the uplink control channel resource for the feedback associated with the sidelink communication overlapping with both the first uplink data message and the second uplink data message.

In some examples of the method, apparatuses, and non-transitory computer-readable medium described herein, multiplexing the feedback associated with the sidelink communication with one of the first uplink data message or the second uplink data message in accordance with the configured multiplexing procedure may include operations, features, means, or instructions for multiplexing the feedback associated with the sidelink communication with the second uplink data message based on the second priority index having the lower priority than the first priority index, where transmitting the first uplink data message and the second uplink data message may be based on multiplexing the feedback associated with the sidelink communication with the second uplink data message.

In some examples of the method, apparatuses, and non-transitory computer-readable medium described herein, multiplexing the feedback associated with the sidelink communication with one of the first uplink data message or the second uplink data message in accordance with the configured multiplexing procedure may include operations, features, means, or instructions for multiplexing the feedback associated with the sidelink communication with the first uplink data message based on the first priority index having a higher priority than the second priority index, where transmitting the first uplink data message and the second uplink data message may be based on multiplexing the feedback associated with the sidelink communication with the first uplink data message.

In some examples of the method, apparatuses, and non-transitory computer-readable medium described herein, multiplexing the feedback associated with the sidelink communication with one of the first uplink data message or the second uplink data message in accordance with the configured multiplexing procedure may include operations, features, means, or instructions for multiplexing the feedback associated with the sidelink communication with a relatively earlier of the first uplink data message and the second uplink data message, where transmitting the first uplink data message and the second uplink data message may be based on multiplexing the feedback associated with the sidelink communication with the relatively earlier of the first uplink data message and the second uplink data message.

In some examples of the method, apparatuses, and non-transitory computer-readable medium described herein, multiplexing the feedback associated with the sidelink communication with one of the first uplink data message or the second uplink data message in accordance with the configured multiplexing procedure may include operations, features, means, or instructions for multiplexing the feedback associated with the sidelink communication with a relatively later of the first uplink data message and the second uplink data message, where transmitting the first uplink data message and the second uplink data message may be based on multiplexing the feedback associated with the sidelink communication with the relatively later of the first uplink data message and the second uplink data message.

In some examples of the method, apparatuses, and non-transitory computer-readable medium described herein, multiplexing the feedback associated with the sidelink communication with one of the first uplink data message or the second uplink data message in accordance with the configured multiplexing procedure may include operations, features, means, or instructions for multiplexing the feedback associated with the sidelink communication with one of the first uplink data message or the second uplink data message based on which of the first uplink data message or the second uplink data message may be scheduled by relatively earlier DCI, where transmitting the first uplink data message and the second uplink data message may be based on multiplexing the feedback associated with the sidelink communication with the one of the first uplink data message or the second uplink data message that may be scheduled by the relatively earlier DCI.

In some examples of the method, apparatuses, and non-transitory computer-readable medium described herein, multiplexing the feedback associated with the sidelink communication with one of the first uplink data message or the second uplink data message in accordance with the configured multiplexing procedure may include operations, features, means, or instructions for multiplexing the feedback associated with the sidelink communication with one of the first uplink data message or the second uplink data message based on which of the first uplink data message or the second uplink data message may be scheduled by relatively later DCI, where transmitting the first uplink data message and the second uplink data message may be based on multiplexing the feedback associated with the sidelink communication with the one of the first uplink data message or the second uplink data message that may be scheduled by the relatively later DCI.

In some examples of the method, apparatuses, and non-transitory computer-readable medium described herein, obtaining the second signal indicating whether the feedback associated with the sidelink communication can be multiplexed with the first uplink data message includes receiving, from the base station, a control signal allocating the uplink control channel resource for the feedback associated with the sidelink communication, where the control signal indicates that the feedback associated with the sidelink communication can be multiplexed with one of the first uplink data message or the second uplink data message, and multiplexing the feedback associated with the sidelink communication with one of the first uplink data message or the second uplink data message in accordance with the configured multiplexing procedure includes multiplexing the feedback associated with the sidelink communication with which of the first uplink data message or the second uplink data message may be indicated by the control signal, where transmitting the first uplink data message and the second uplink data message may be based on multiplexing the feedback associated with the sidelink communication with the one of the first uplink data message or the second uplink data message that may be indicated by the control signal.

In some examples of the method, apparatuses, and non-transitory computer-readable medium described herein, multiplexing the feedback associated with the sidelink communication with one of the first uplink data message or the second uplink data message in accordance with the configured multiplexing procedure may include operations, features, means, or instructions for multiplexing the feedback associated with the sidelink communication with one of the first uplink data message or the second uplink data message based on which of the first uplink data message or the second uplink data message may be located on a same cell as the uplink control channel resource, where transmitting the first uplink data message and the second uplink data message may be based on multiplexing the feedback associated with the sidelink communication with the one of the first uplink data message or the second uplink data message that may be located on the same cell as the uplink control channel resource.

In some examples of the method, apparatuses, and non-transitory computer-readable medium described herein, the first uplink data message associated with the first priority index occupies a high priority PUSCH and the first priority index includes a priority index value 1.

Some examples of the method, apparatuses, and non-transitory computer-readable medium described herein may further include operations, features, means, or instructions for obtaining the second signal includes receiving the second signal from the base station or reading the second signal from a storage medium of the UE.

A method for wireless communication at a base station is described. The method may include transmitting, to a UE, a first signal scheduling a first uplink data message associated with a first priority index, the first uplink data message at least partially overlapping in time with an uplink control channel resource for feedback associated with sidelink communication at the UE, transmitting, to the UE, a second signal indicating whether the feedback associated with the sidelink communication can be multiplexed with the first uplink data message, and receiving, from the UE, the first uplink data message in accordance with the second signal.

An apparatus for wireless communication at a base station is described. The apparatus may include a processor, memory coupled with the processor, and instructions stored in the memory. The instructions may be executable by the processor to cause the apparatus to transmit, to a UE, a first signal scheduling a first uplink data message associated with a first priority index, the first uplink data message at least partially overlapping in time with an uplink control channel resource for feedback associated with sidelink communication at the UE, transmit, to the UE, a second signal indicating whether the feedback associated with the sidelink communication can be multiplexed with the first uplink data message, and receive, from the UE, the first uplink data message in accordance with the second signal.

Another apparatus for wireless communication at a base station is described. The apparatus may include means for transmitting, to a UE, a first signal scheduling a first uplink data message associated with a first priority index, the first uplink data message at least partially overlapping in time with an uplink control channel resource for feedback associated with sidelink communication at the UE, means for transmitting, to the UE, a second signal indicating whether the feedback associated with the sidelink communication can be multiplexed with the first uplink data message, and means for receiving, from the UE, the first uplink data message in accordance with the second signal.

A non-transitory computer-readable medium storing code for wireless communication at a base station is described. The code may include instructions executable by a processor to transmit, to a UE, a first signal scheduling a first uplink data message associated with a first priority index, the first uplink data message at least partially overlapping in time with an uplink control channel resource for feedback associated with sidelink communication at the UE, transmit, to the UE, a second signal indicating whether the feedback associated with the sidelink communication can be multiplexed with the first uplink data message, and receive, from the UE, the first uplink data message in accordance with the second signal.

In some examples of the method, apparatuses, and non-transitory computer-readable medium described herein, transmitting the second signal indicating whether the feedback associated with the sidelink communication can be multiplexed with the first uplink data message may include operations, features, means, or instructions for transmitting an indication of a parameter, where receiving the first uplink data message may be based on whether a value of the parameter satisfies a threshold value.

In some examples of the method, apparatuses, and non-transitory computer-readable medium described herein, receiving the first uplink data message may include operations, features, means, or instructions for receiving the first uplink data message with the feedback associated with the sidelink communication multiplexed with the first uplink data message based on the value of the parameter satisfying the threshold value.

In some examples of the method, apparatuses, and non-transitory computer-readable medium described herein, receiving the first uplink data message may include operations, features, means, or instructions for receiving the first uplink data message without the feedback associated with the sidelink communication multiplexed with the first uplink data message based on the value of the parameter failing to satisfy the threshold value.

In some examples of the method, apparatuses, and non-transitory computer-readable medium described herein, the base station transmits an indication of the threshold value to the UE or the threshold value may be standardly configured.

In some examples of the method, apparatuses, and non-transitory computer-readable medium described herein, the threshold value may be based on a service type or a latency constraint associated with the UE.

In some examples of the method, apparatuses, and non-transitory computer-readable medium described herein, transmitting the second signal indicating whether the feedback associated with the sidelink communication can be multiplexed with the first uplink data message may include operations, features, means, or instructions for transmitting a control signal allocating the uplink control channel resource for the feedback associated with the sidelink communication, where the control signal indicates whether the feedback associated with the sidelink communication can be multiplexed with the first uplink data message.

In some examples of the method, apparatuses, and non-transitory computer-readable medium described herein, the control signal includes DCI signaling or RRC signaling.

In some examples of the method, apparatuses, and non-transitory computer-readable medium described herein, transmitting the second signal indicating whether the feedback associated with the sidelink communication can be multiplexed with the first uplink data message may include operations, features, means, or instructions for transmitting an indication that the feedback associated with the sidelink communication can be multiplexed with the first uplink data message, the method further including, transmitting, to the UE, a third signal scheduling a second uplink data message associated with a second priority index having a lower priority than the first priority index, where the second uplink data message at least partially overlaps in time with the uplink control channel resource for the feedback associated with the sidelink communication, and where the feedback associated with the sidelink communication can be multiplexed with the second uplink data message, and receiving, from the UE, the second uplink data message in accordance with a configured multiplexing procedure.

Some examples of the method, apparatuses, and non-transitory computer-readable medium described herein may further include operations, features, means, or instructions for demultiplexing the feedback associated with the sidelink communication from one of the first uplink data message or the second uplink data message in accordance with the configured multiplexing procedure and based on the uplink control channel resource for the feedback associated with the sidelink communication overlapping with both the first uplink data message and the second uplink data message.

In some examples of the method, apparatuses, and non-transitory computer-readable medium described herein, demultiplexing the feedback associated with the sidelink communication from one of the first uplink data message or the second uplink data message in accordance with the configured multiplexing procedure may include operations, features, means, or instructions for demultiplexing the feedback associated with the sidelink communication from the second uplink data message based on the second priority index having the lower priority than the first priority index.

In some examples of the method, apparatuses, and non-transitory computer-readable medium described herein, demultiplexing the feedback associated with the sidelink communication from one of the first uplink data message or the second uplink data message in accordance with the configured multiplexing procedure may include operations, features, means, or instructions for demultiplexing the feedback associated with the sidelink communication from the first uplink data message based on the first priority index having a higher priority than the second priority index.

In some examples of the method, apparatuses, and non-transitory computer-readable medium described herein, demultiplexing the feedback associated with the sidelink communication from one of the first uplink data message or the second uplink data message in accordance with the configured multiplexing procedure may include operations, features, means, or instructions for demultiplexing the feedback associated with the sidelink communication from a relatively earlier of the first uplink data message and the second uplink data message.

In some examples of the method, apparatuses, and non-transitory computer-readable medium described herein, demultiplexing the feedback associated with the sidelink communication from one of the first uplink data message or the second uplink data message in accordance with the configured multiplexing procedure may include operations, features, means, or instructions for demultiplexing the feedback associated with the sidelink communication from a relatively later of the first uplink data message and the second uplink data message.

In some examples of the method, apparatuses, and non-transitory computer-readable medium described herein, demultiplexing the feedback associated with the sidelink communication from one of the first uplink data message or the second uplink data message in accordance with the configured multiplexing procedure may include operations, features, means, or instructions for demultiplexing the feedback associated with the sidelink communication from one of the first uplink data message or the second uplink data message based on which of the first uplink data message or the second uplink data message may be scheduled by relatively earlier DCI.

In some examples of the method, apparatuses, and non-transitory computer-readable medium described herein, demultiplexing the feedback associated with the sidelink communication from one of the first uplink data message or the second uplink data message in accordance with the configured multiplexing procedure may include operations, features, means, or instructions for demultiplexing the feedback associated with the sidelink communication from one of the first uplink data message or the second uplink data message based on which of the first uplink data message or the second uplink data message may be scheduled by relatively later DCI.

Some examples of the method, apparatuses, and non-transitory computer-readable medium described herein may further include operations, features, means, or instructions for transmitting the second signal indicating whether the feedback associated with the sidelink communication can be multiplexed with the first uplink data message includes transmitting a control signal allocating the uplink control channel resource for the feedback associated with the sidelink communication, where the control signal indicates that the feedback associated with the sidelink communication can be multiplexed with one of the first uplink data message or the second uplink data message and demultiplexing the feedback associated with the sidelink communication from one of the first uplink data message or the second uplink data message in accordance with the configured multiplexing procedure includes demultiplexing the feedback associated with the sidelink communication from which of the first uplink data message or the second uplink data message may be indicated by the control signal.

In some examples of the method, apparatuses, and non-transitory computer-readable medium described herein, demultiplexing the feedback associated with the sidelink communication from one of the first uplink data message or the second uplink data message in accordance with the configured multiplexing procedure may include operations, features, means, or instructions for demultiplexing the feedback associated with the sidelink communication from one of the first uplink data message or the second uplink data message based on which of the first uplink data message or the second uplink data message may be located on a same cell as the uplink control channel resource.

In some examples of the method, apparatuses, and non-transitory computer-readable medium described herein, the first uplink data message associated with the first priority index occupies a high priority PUSCH and the first priority index includes a priority index value 1.

DETAILED DESCRIPTION

Figure 1:
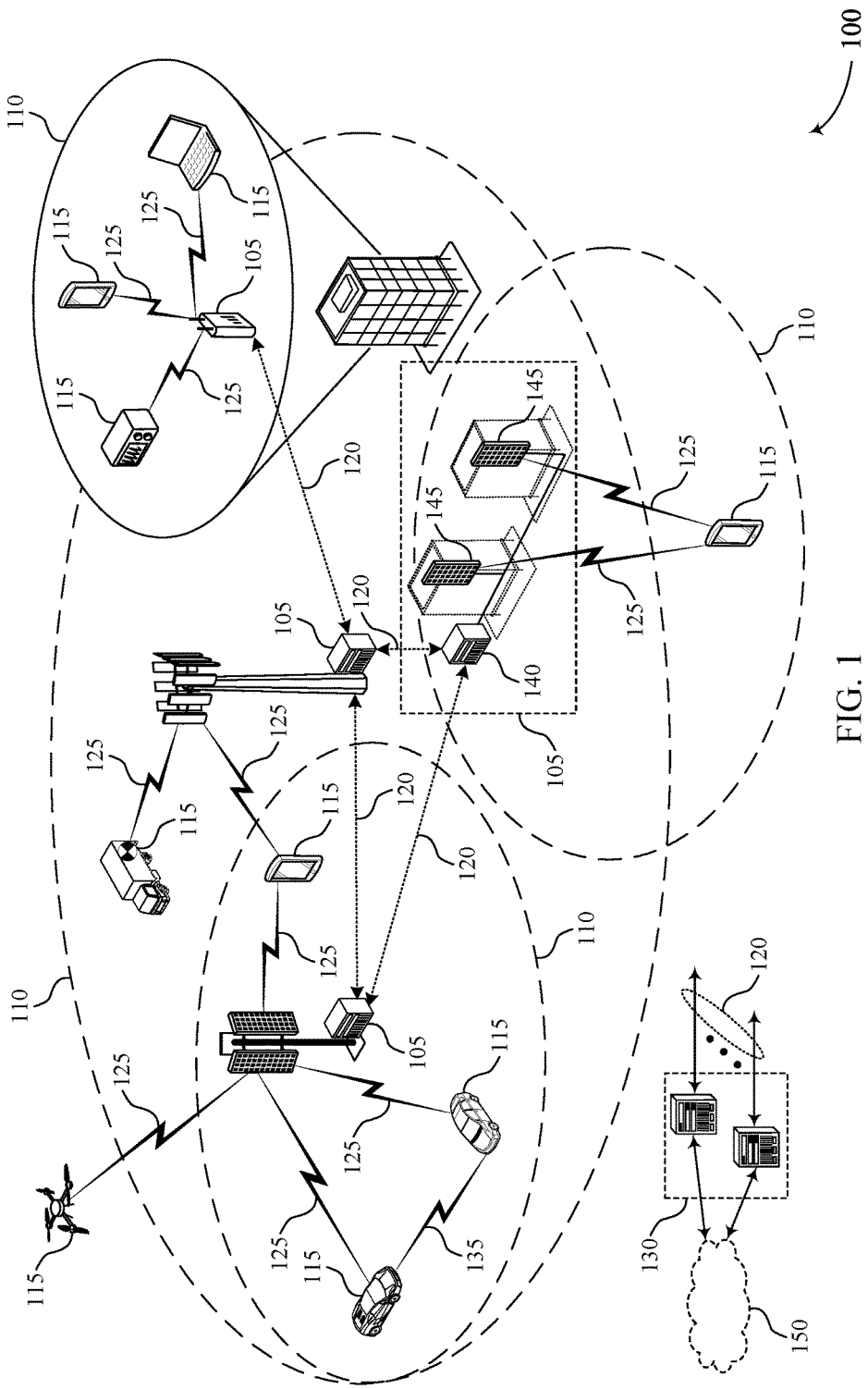
FIG. 1 illustrates an example of a wireless communications system that supports techniques for multiplexing sidelink feedback on a high priority physical uplink shared channel (PUSCH) in accordance with aspects of the present disclosure.

In some wireless communications systems, a user equipment (UE) may communicate with another UE in accordance with a sidelink resource allocation Mode 1 and may transmit feedback associated with the sidelink communication to a base station over a physical uplink control channel (PUCCH). Such feedback associated with sidelink communication may include or may otherwise be referred to as sidelink hybrid automatic repeat request (HARQ) acknowledgement (ACK) feedback. The UE may also receive one or more messages from the base station that schedule an uplink data message over a physical uplink shared channel (PUSCH). The PUSCH may be associated with a priority index, including a high priority index or a low priority index, and, if the PUCCH and the PUSCH overlap in time, the UE and the base station may support a multiplexing of the sidelink HARQ-ACK feedback with the uplink data message based on the priority index of the PUSCH.

For example, the UE may multiplex the sidelink HARQ-ACK feedback with the uplink data message if the PUSCH is associated with a low priority index (e.g., if the PUSCH is a low priority PUSCH) and may drop the sidelink HARQ-ACK feedback if the PUSCH is associated with a high priority index (e.g., if the PUSCH is a high priority PUSCH). In some scenarios, it may be advantageous to enable some conditional multiplexing of sidelink HARQ-ACK feedback over the PUSCH even in examples in which the PUSCH is a high priority PUSCH. In some systems, however, the base station may lack information on or recognition of a priority of the sidelink HARQ-ACK feedback, which may lead to ambiguity at the base station as to whether the UE multiplexes sidelink HARQ-ACK feedback over a high priority PUSCH. This, in turn, may lead to a use of multiple decoding hypotheses at the base station, potentially increasing computational cost, complexity, and latency.

In some implementations of the present disclosure, the UE and the base station may support a conditional multiplexing of sidelink HARQ-ACK feedback on high priority PUSCH based on signaling from the base station or one or more multiplexing rules or procedures, or both. In some examples, for instance, the UE may receive an indication of a parameter, such as an sl-Priority Threshold-UL-URLLC parameter or an sl-PriorityThreshold parameter, from the base station and the UE may multiplex the sidelink HARQ-ACK feedback with the uplink data message over the high priority PUSCH if a value of the parameter satisfies a threshold. Additionally or alternatively, the UE may receive an indication of whether the sidelink HARQ-ACK feedback can be multiplexed with the uplink data message over the high priority PUSCH via a control signal that schedules the sidelink HARQ-ACK feedback. Further, in scenarios in which the sidelink HARQ-ACK feedback overlaps with both the high priority PUSCH and a low priority PUSCH, the UE may multiplex the sidelink HARQ-ACK feedback with an uplink data message over one of the high priority PUSCH or the low priority PUSCH in accordance with one or more multiplexing rules or procedures that are mutually understood between the UE and the base station.

Particular implementations of the subject matter described in this disclosure can be implemented to realize one or more of the following potential advantages. For example, based on implementing some conditional multiplexing of sidelink HARQ-ACK feedback on high priority PUSCH, the UE may transmit some (high priority) sidelink HARQ-ACK feedback to the base station with lower latency and higher reliability. Further, and based on facilitating the conditional multiplexing of the sidelink HARQ-ACK on the high priority PUSCH using information that is available at both the UE and the base station, the base station may avoid decoding the high priority PUSCH using multiple hypotheses and may instead decode the high priority PUSCH using a single hypothesis, which may reduce computational cost, complexity, and latency at the base station. As a result of communicating high priority sidelink HARQ-ACK feedback with lower latency and greater reliability, the UE and the base station may make one or more scheduling decisions based on the sidelink HARQ-ACK feedback within a shorter timeline and more accurately, which may provide a greater likelihood for successful communication within the wireless communications system, greater system throughput, higher data rates, and greater spectral efficiency, among other examples.

Aspects of the disclosure are initially described in the context of wireless communications systems. Aspects of the disclosure are further illustrated by and described with reference to a signaling diagram, multiplexing diagrams, and a process flow. Aspects of the disclosure are further illustrated by and described with reference to apparatus diagrams, system diagrams, and flowcharts that relate to techniques for multiplexing sidelink feedback on a high priority PUSCH.

FIG. 1 illustrates an example of a wireless communications system 100 that supports techniques for multiplexing sidelink feedback on a high priority PUSCH in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of one or more radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some systems, such as the wireless communications system 100, a UE 115 may communicate with another UE 115 in accordance with a sidelink resource allocation Mode 1. For example, the UE 115 may receive a sidelink resource grant for communication with the other UE 115 from a base station 105 and may communicate with the other UE 115 using resources of the resource grant. In some examples, the base station 105 may also allocate a PUCCH resource over which the UE 115 is to transmit uplink control information (UCI) including feedback associated with the sidelink communication (e.g., sidelink HARQ-ACK feedback) to the base station 105. For example, NR sidelink supports providing feedback between UEs 115 over a physical sidelink feedback channel (PSFCH) and, in Mode 1 (e.g., according to which sidelink transmissions are scheduled by the base station 105), feedback for sidelink transmissions may also be reported back to the base station 105. The base station 105 may use such feedback to make one or more scheduling decisions for the UE 115 or the other UE 115 (e.g., may allocate another sidelink resource grant to the two UEs 115 if the feedback indicates that the scheduled sidelink transmission failed to be successfully received).

In some scenarios, the PUCCH over which the UE 115 is to transmit the UCI including the sidelink HARQ-ACK feedback may overlap with a PUSCH over which the UE 115 is to transmit an uplink data message. For example, the UE 115 may receive, from the base station 105, a first signal that schedules the uplink data message over the PUSCH that at least partially overlaps in time with the PUCCH. In such examples in which the PUCCH carrying UCI overlaps with a PUSCH, the UE 115 may, in general, multiplex the UCI on the PUSCH and transmit the UCI over the PUSCH. In some examples, however, there may be two priorities for PUSCH and PUCCH, such as high priority and low priority, and a multiplexing of UCI on the PUSCH may depend on the relative priorities of the overlapping PUSCH and PUCCH. In some systems, for example, the UE 115 may multiplex UCI from a high priority PUCCH on a high priority PUSCH (and not on a low priority PUSCH) and may multiplex UCI from a low priority PUCCH on a low priority PUSCH (and not on a high priority PUSCH). In some other systems, the UE 115 may also multiplex UCI from a high priority PUCCH on a low priority PUSCH.

The UE 115 and the base station 105 may support prioritization between different overlapping PUCCH resources. For example, if a first PUCCH carrying sidelink information (e.g., such as sidelink HARQ-ACK feedback) overlaps with a second PUCCH carrying other UCI, the UE 115 may perform prioritization to determine which PUCCH is dropped. In some examples, the UE 115 may use a highest priority (e.g., a highest value from 1 to 8, such that sidelink may have 8 levels of priority, with 1 corresponding to the highest priority and 8 corresponding to the lowest priority) of sidelink HARQ-ACK feedback included in the first PUCCH and one or more radio resource control (RRC) parameters that map from the two UCI PUCCH priorities (e.g., high priority and low priority) to sidelink priorities to determine which PUCCH is dropped. In some aspects, the one or more RRC parameters include a first RRC parameter that maps from high priority to sidelink priority and a second RRC parameter that maps from low priority to sidelink priority.

Such a first RRC parameter that maps from high priority to sidelink priority may include or refer to an sl-PriorityThreshold-UL-URLLC parameter and such a second RRC parameter that maps from low priority to sidelink priority may include or refer to an sl-Priority Threshold parameter. As such, if the second PUCCH is associated with a high priority, the UE 115 may compare the sl-PriorityThreshold-UL-URLLC parameter to the highest priority of the sidelink HARQ-ACK included in the first PUCCH and may drop the PUCCH associated with a lower of the two priorities. Alternatively, if the second PUCCH is associated with a low priority, the UE 115 may compare the sl-PriorityThreshold parameter to the highest priority of the sidelink HARQ-ACK included in the first PUCCH and may similarly drop the PUCCH associated with a lower of the two priorities. In some cases, the base station 105 may be unaware of the priority of the sidelink HARQ-ACK feedback (or of any sidelink transmission). As such, if the base station 105 schedules such a scenario in which the first PUCCH carrying sidelink information overlaps with the second PUCCH carrying other UCI, the base station 105 may attempt to decode its reception as both the first PUCCH and the second PUCCH (e.g., may check both cases) to identify which PUCCH the UE 115 actually transmitted.

Further, some systems, such as NR systems, may allow for multiplexing of sidelink HARQ-ACK on low priority PUSCH. For example, the UE 115 may multiplex the sidelink HARQ-ACK feedback with an uplink data message if the PUCCH over which the UE 115 is to transmit the sidelink HARQ-ACK feedback overlaps with a low priority PUSCH and may refrain from multiplexing the sidelink HARQ-ACK feedback with an uplink data message if the PUCCH over which the UE 115 is to transmit the sidelink HARQ-ACK feedback overlaps with a high priority PUSCH. In other words, after prioritization with other PUCCH transmissions, when PUCCH carrying sidelink HARQ-ACK information is prioritized and overlaps with a PUSCH of priority index 1 (e.g., which may denote or indicate a high priority PUSCH), the UE 115 may drop the PUCCH carrying the sidelink HARQ-ACK information if it overlaps with a PUSCH of priority index 1. Alternatively, after prioritization with other PUCCH transmissions, when PUCCH carrying sidelink HARQ-ACK information is prioritized and overlaps with a PUSCH of priority index 0, the UE 115 may multiplex the sidelink HARQ-ACK information on the overlapping PUSCH of priority index 0 following some defined rules (and if the PUSCH does not include Uu UCI, which may occasionally be present in cases of semi-static CSI). In other words, the PUSCH with sidelink HARQ-ACK may be subject to the prioritization with any other uplink transmissions as per the defined rules.

In some systems, a multiplexing of sidelink HARQ-ACK feedback may be prohibited because allowing for a multiplexing of the sidelink HARQ-ACK feedback on high priority PUSCH may degrade a reliability of the high priority PUSCH (e.g., and high priority PUSCH may be URLLC-type information of relatively high importance). Some conditional multiplexing of the sidelink HARQ-ACK feedback on the high priority PUSCH, however, may reduce latency and increase a reliability associated with the sidelink HARQ-ACK feedback. Relying on sidelink priority to determine whether the UE 115 is to multiplex sidelink HARQ-ACK on the high priority PUSCH, however, may introduce ambiguity at the base station 105 because the base station 105 may lack knowledge or, awareness to, or recognition of sidelink priorities or may otherwise lack any way of comparing a sidelink priority to a threshold or benchmark. As such, the base station 105 may have to decode (e.g., blind decode) the high priority PUSCH assuming multiple hypotheses, as the base station 105 may not be aware of when sidelink HARQ-ACK feedback is multiplexed on the high priority PUSCH nor when sidelink HARQ-ACK feedback is not multiplexed on the high priority PUSCH (e.g., when sidelink HARQ-ACK feedback is dropped).

In some implementations, the UE 115 and the base station 105 may conditionally enable multiplexing of sidelink HARQ-ACK information on a high priority PUSCH using information that is available at both the UE 115 and the base station 105, which may enable the base station 105 to avoid decoding the high priority PUSCH using multiple decoding hypotheses. The UE 115 and the base station 105 may support such a conditional multiplexing of sidelink HARQ-ACK feedback on high priority PUSCH based on signaling from the base station 105 or one or more multiplexing rules or procedures, or both.

Figure 2:
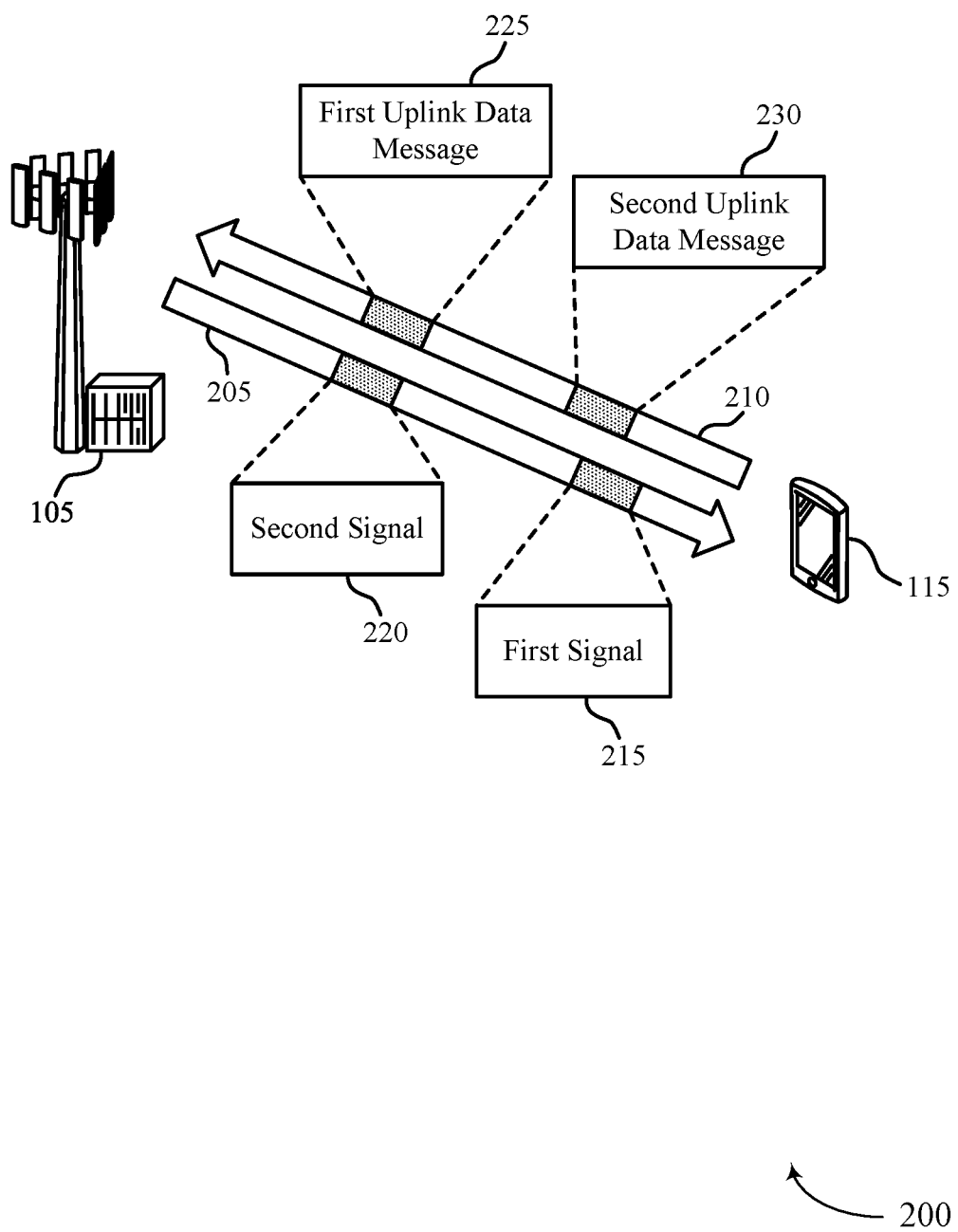
FIG. 2 illustrates an example of a signaling diagram that supports techniques for multiplexing sidelink feedback on a high priority PUSCH in accordance with aspects of the present disclosure.

FIG. 2 illustrates an example of a signaling diagram 200 that supports techniques for multiplexing sidelink feedback on a high priority PUSCH in accordance with aspects of the present disclosure. The signaling diagram 200 may implement or be implemented to realize aspects of the wireless communications system 100. For example, the signaling diagram 200 may include a UE 115 and a base station 105, which may be examples of corresponding devices described herein, including with reference to FIG. 1. In some implementations, the UE 115 may receive scheduling information from the base station 105 such that a PUCCH over which the UE 115 is to transmit feedback associated with sidelink communication at least partially overlaps in time with a high priority PUSCH over which the UE 115 is to transmit a first uplink data message 225. The UE 115 may determine whether to multiplex the feedback associated with the sidelink communication with the first uplink data message 225 on the high priority PUSCH based on some condition, such as signaling from the base station 105 or following one or more multiplexing rules or procedures, or both.

For example, the UE 115 may receive, from the base station 105 via a communication link 205 (e.g., a downlink), a first signal 215 that schedules the first uplink data message 225. In some aspects, the first signal 215 may include or otherwise refer to downlink control information (DCI) or configuration signaling, such as RRC signaling (e.g., in examples in which the first uplink data message 225 is scheduled for a configured grant (CG) PUSCH), or both. In some examples, the first signal 215 may allocate a first PUSCH (e.g., a first PUSCH resource) for the first uplink data message 225 and the first PUSCH may be an example of a high priority PUSCH (e.g., the first PUSCH may be associated with a high priority index, such as a priority index 1). In some scenarios, the first uplink data message 225 (e.g., and the first PUSCH) may at least partially overlap in time with a PUCCH resource allocated to the UE 115 for feedback, such as sidelink HARQ-ACK feedback or information, associated with sidelink communication at the UE 115.

The UE 115 may also receive, from the base station 105, a second signal 220 that indicates whether the sidelink HARQ-ACK feedback can be (or is to be) multiplexed with the first uplink data message 225. In some implementations, the second signal 220 may include an indication of a parameter, such as an sl-PriorityThreshold-UL-URLLC parameter or an sl-Priority Threshold parameter, and the UE 115 may determine whether to multiplex the sidelink HARQ-ACK feedback based on a value of the parameter. For example, the UE 115 may multiplex the sidelink HARQ-ACK feedback on the first PUSCH (e.g., the high priority PUSCH) carrying the first uplink data message 225 if the value of the parameter satisfies (e.g., is below) a threshold value.

As such, the UE 115 may multiplex the sidelink HARQ-ACK feedback with the first uplink data message 225 on the first PUSCH if the parameter satisfies the threshold value and may drop the sidelink HARQ-ACK feedback if the parameter fails to satisfy (e.g., is above) the threshold value. The parameter may be a (dynamically or RRC) configured parameter or a pre-configured parameter (e.g., a preloaded parameter) and, accordingly, the second signal 220 may include or refer to DCI or RRC signaling, or both. Further, in some examples, the threshold value may be configured or pre-configured (e.g., preloaded) at the UE 115. Additionally or alternatively, the UE 115 may receive (e.g., via RRC signaling) an indication of the threshold value from the base station 105. In other words, the threshold value may be specified or (pre-)configured. In some implementations, the threshold value may be based on a service type or a latency constraint associated with the UE 115 (e.g., or associated with the sidelink communication at the UE 115). Additionally or alternatively, the base station 105 may configure the value of the parameter based on the service type or latency constraint associated with the UE 115 (e.g., or associated with the sidelink communication at the UE 115).

In some implementations, the second signal 220 may include or refer to a control signal allocating the PUCCH for the sidelink HARQ-ACK feedback and the control signal may indicate whether the sidelink HARQ-ACK can be multiplexed with the first uplink data message 225 over the first PUSCH. In such implementations, the second signal 220 may include or refer to DCI or configuration signaling, such as RRC signaling (e.g., in examples in which the PUCCH resource is associated with a CG). As such, the DCI or configuration may provide, allocate, or otherwise assign the PUCCH resource for the sidelink HARQ-ACK and may also indicate whether the sidelink HARQ-ACK feedback can be multiplexed on the first PUSCH (e.g., the high priority PUSCH) with the first uplink data message 225. For example, the UE 115 may multiplex the sidelink HARQ-ACK feedback with the first uplink data message 225 over the first PUSCH if the second signal 220 indicates that the UE 115 is able to multiplex the sidelink HARQ-ACK feedback on high priority PUSCH and may drop the sidelink HARQ-ACK feedback with the first uplink data message 225 over the first PUSCH if the second signal 220 indicates that the UE 115 is unable to multiplex the sidelink HARQ-ACK feedback on high priority PUSCH. The UE 115 may transmit the first uplink data message 225 to the base station 105 via a communication link 210 based on the conditional multiplexing of the sidelink HARQ-ACK feedback. Additional details relating to how the UE 115 may either multiplex or drop the sidelink HARQ-ACK feedback based on signaling from the base station 105 are illustrated by and described with reference to FIG. 3.

Further, in some scenarios, the UE 115 may receive, from the base station 105, a third signal scheduling a second uplink data message 230. In some aspects, the third signal may include or otherwise refer to DCI or configuration signaling, such as RRC signaling (e.g., in examples in which the second uplink data message 230 is scheduled for a CG PUSCH), or both. In some examples, the third signal may allocate a second PUSCH (e.g., a second PUSCH resource) for the second uplink data message 230 and the second PUSCH may be an example of a low priority PUSCH (e.g., the second PUSCH may be associated with a low priority index, such as a priority index 0). In some scenarios, the second uplink data message 230 (e.g., the second PUSCH) may at least partially overlap in time with the PUCCH resource allocated to the UE 115 for the sidelink HARQ-ACK feedback associated with sidelink communication at the UE 115. In other words, in such scenarios, the PUCCH resource over which the UE 115 is originally scheduled to transmit the sidelink HARQ-ACK feedback may overlap with both the first uplink data message 225 on a high priority PUSCH and the second uplink data message 230 on a low priority PUSCH. In such scenarios, the UE 115 may determine with which of the first uplink data message 225 or the second uplink data message 230 to multiplex the sidelink HARQ-ACK feedback in accordance with one or more multiplexing rules or procedures, as illustrated by and described in more detail with reference to FIG. 4.

Figure 3:
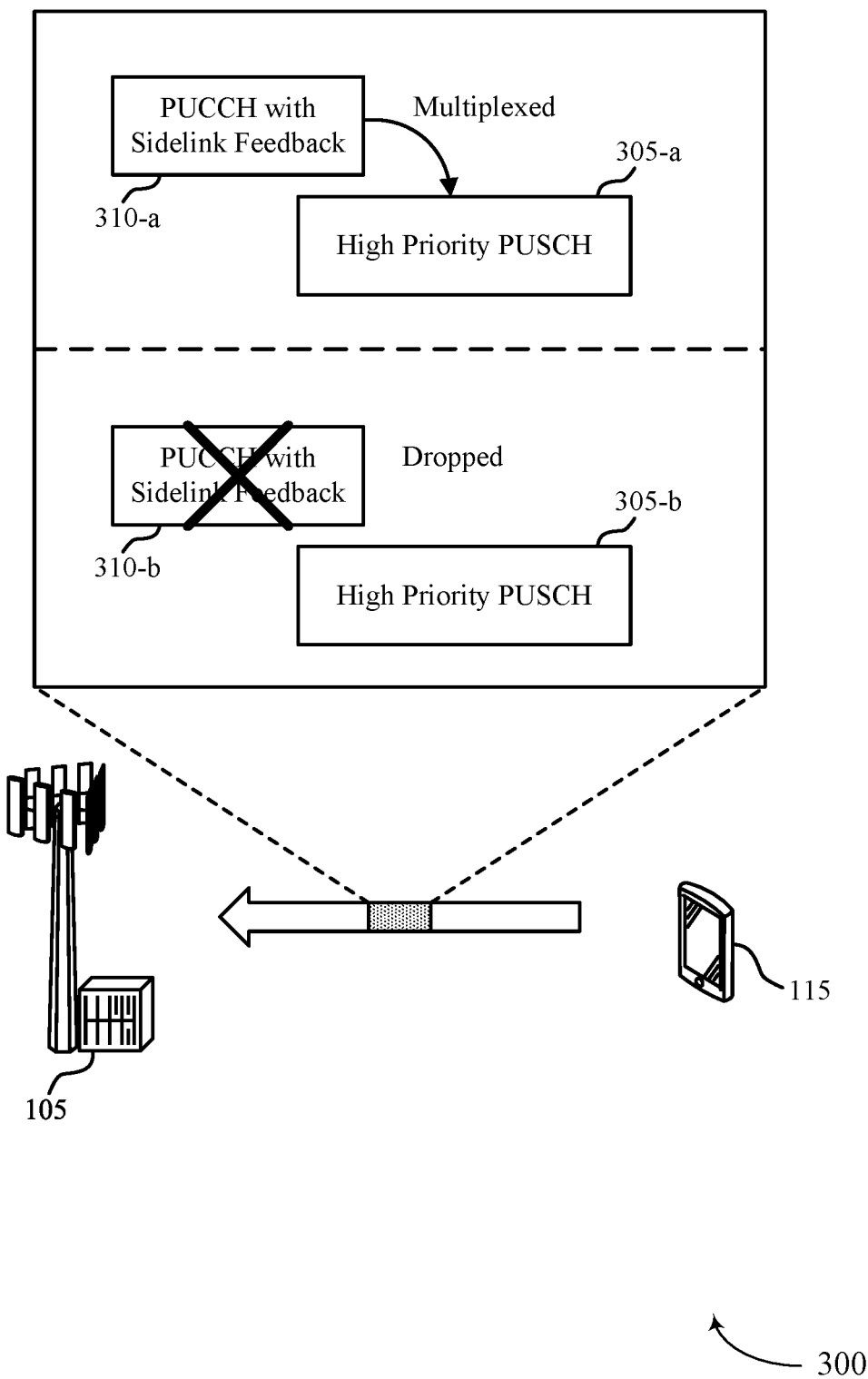
FIGS. 3 and 4 illustrates an example of a multiplexing diagrams that support techniques for multiplexing sidelink feedback on a high priority PUSCH in accordance with aspects of the present disclosure.

FIG. 3 illustrates an example of a multiplexing diagram 300 that supports techniques for multiplexing sidelink feedback on a high priority PUSCH in accordance with aspects of the present disclosure. The multiplexing diagram 300 may implement or be implemented to realize aspects of the wireless communications system 100 or the signaling diagram 200. For example, the multiplexing diagram 300 illustrates communication between a UE 115 and a base station 105, which may be examples of corresponding devices described herein, including with reference to FIGS. 1 and 2. In some implementations, the UE 115 may support a conditional multiplexing of sidelink HARQ-ACK feedback scheduled for a PUCCH 310 on a high priority PUSCH 305 based on signaling from the base station 105.

For example, if the UE 115 receives scheduling information such that a high priority PUSCH 305-*a* at least partially overlaps in time with a PUCCH 310-*a* over which the UE 115 is originally scheduled to transmit sidelink feedback (e.g., sidelink HARQ-ACK feedback), the UE 115 may multiplex the sidelink feedback with an uplink data message over the high priority PUSCH 305-*a* if the UE 115 receives signaling from the base station 105 indicating that the sidelink feedback may be multiplexed on the high priority PUSCH 305-*a*. In some implementations, the UE 115 may receive an indication of a parameter and may compare a value of the parameter to a threshold to determine whether to multiplex the sidelink feedback on the high priority PUSCH 305-*a*. In such implementations, the UE 115 may determine that the value of the parameter satisfies (e.g., is below) the threshold and may multiplex the sidelink feedback on the high priority PUSCH 305-*a* accordingly. Additionally or alternatively, the UE 115 may receive, via DCI or configuration signaling that allocates the PUCCH 310-*a* for the sidelink feedback, an indication of whether the sidelink feedback is able to be multiplexed on the high priority PUSCH 305-*a*. In implementations in which the UE 115 receives such scheduling DCI or configuration signaling indicating that the UE 115 is able to multiplex the sidelink feedback on the high priority PUSCH 305-*a*, the UE 115 may multiplex the sidelink feedback on the high priority PUSCH 305-*a*.

For further example, if the UE 115 receives scheduling information such that a high priority PUSCH 305-*b* at least partially overlaps in time with a PUCCH 310-*b* over which the UE 115 is originally scheduled to transmit sidelink feedback (e.g., sidelink HARQ-ACK feedback), the UE 115 may drop (e.g., refrain from transmitting) the sidelink feedback if the UE 115 receives signaling from the base station 105 indicating that the sidelink feedback cannot be multiplexed on the high priority PUSCH 305-*b*. In some implementations, the UE 115 may receive an indication of a parameter and may compare a value of the parameter to a threshold to determine whether to multiplex the sidelink feedback on the high priority PUSCH 305-*b* or to drop the sidelink feedback. In such implementations, the UE 115 may determine that the value of the parameter fails to satisfy (e.g., is above) the threshold and may drop the sidelink feedback accordingly. Additionally or alternatively, the UE 115 may receive, via DCI or configuration signaling that allocates the PUCCH 310-*b* for the sidelink feedback, an indication of whether the sidelink feedback is able to be multiplexed on the high priority PUSCH 305-*b*. In implementations in which the UE 115 receives such scheduling DCI or configuration signaling indicating that the UE 115 is not able to multiplex the sidelink feedback on the high priority PUSCH 305-*b*, the UE 115 may accordingly drop the sidelink feedback.

Further, although FIG. 3 illustrates one example overlapping of the PUSCH 305 and the PUCCH 310, the PUSCH 305 and the PUCCH 310 may partially or completely overlap in time in any other manner. In some examples, for instance, the PUSCH 305 and the PUCCH 310 may overlap in time and be separate in frequency or may overlap in both time and in frequency.

Figure 4:
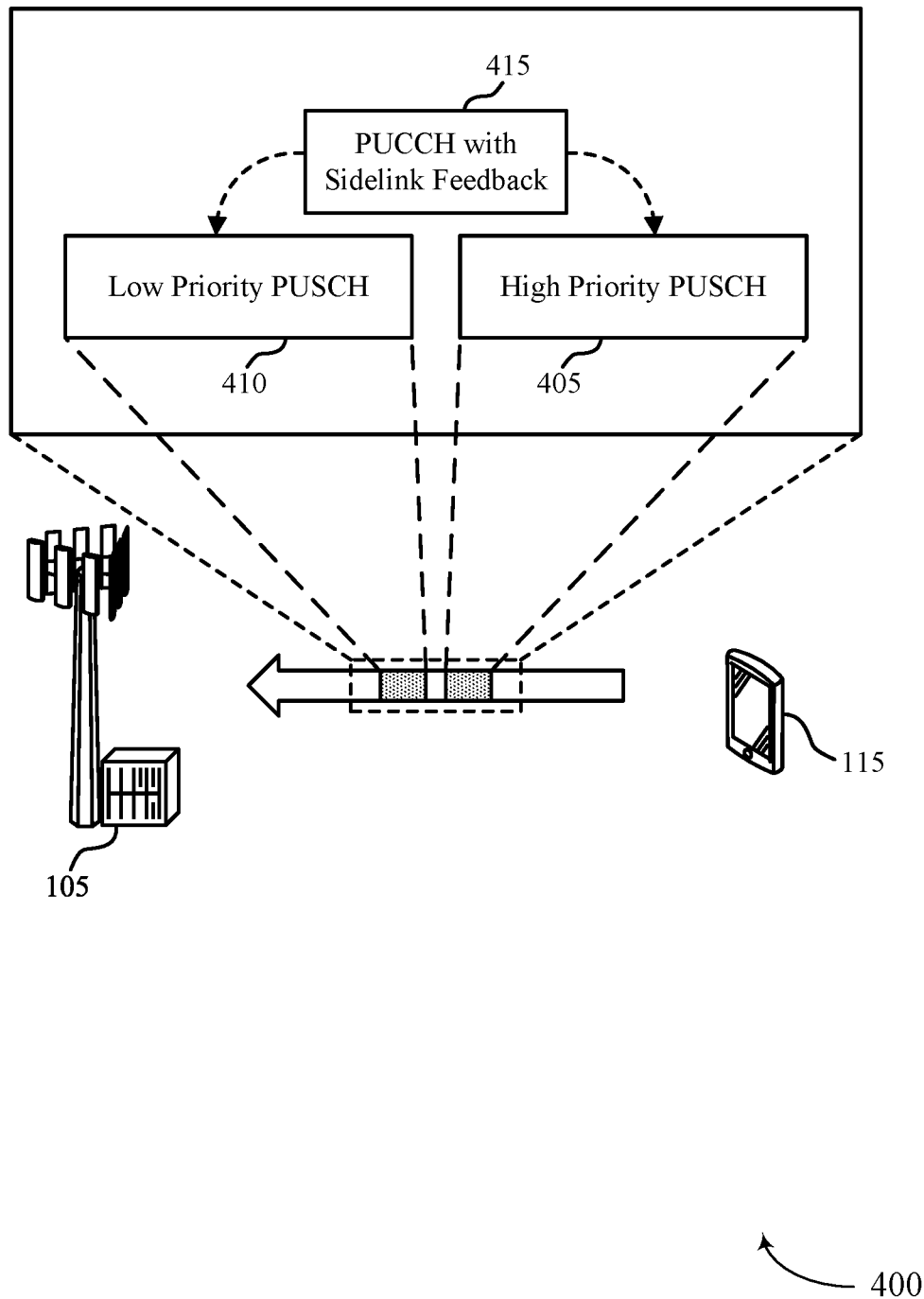

FIG. 4 illustrates an example of a multiplexing diagram 400 that supports techniques for multiplexing sidelink feedback on a high priority PUSCH in accordance with aspects of the present disclosure. The multiplexing diagram 400 may implement or be implemented to realize aspects of the wireless communications system 100 or the signaling diagram 200. For example, the multiplexing diagram 400 illustrates communication between a UE 115 and a base station 105, which may be examples of corresponding devices described herein, including with reference to FIGS. 1 and 2. In some implementations, the UE 115 may multiplex sidelink feedback on one of a high priority PUSCH 405 or a low priority PUSCH 410 in accordance with one or more multiplexing rules or procedures in scenarios in which a PUCCH 415 over which the UE 115 is originally scheduled to transmit the sidelink feedback at least partially overlaps in time with both of the high priority PUSCH 405 and the low priority PUSCH 410.

For example, when the PUCCH 415 carrying the sidelink HARQ-ACK feedback overlaps with both the high priority PUSCH 405 and the low priority PUSCH 410 and meets or satisfies a criteria for multiplexing on both (e.g., if the UE 115 is able to multiplex the sidelink HARQ-ACK feedback on either of the high priority PUSCH 405 or the low priority PUSCH 410), the UE 115 may determine on which PUSCH to multiplex the sidelink HARQ-ACK feedback in accordance with one or more standardly configured or defined multiplexing rules or procedures. In some implementations, for example, the UE 115 may multiplex the sidelink HARQ-ACK feedback on the low priority PUSCH 410 in accordance with the standard configuration. Alternatively, in some other implementations, the UE 115 may multiplex the sidelink HARQ-ACK feedback on the high priority PUSCH 405 in accordance with the standard configuration.

Additionally or alternatively, in some implementations, the UE 115 may multiplex the sidelink HARQ-ACK feedback on an earlier of the high priority PUSCH 405 and the low priority PUSCH 410. For example, and as shown in FIG. 4, if the low priority PUSCH 410 is earlier than the high priority PUSCH 405, the UE 115 may multiplex the sidelink HARQ-ACK feedback on the low priority PUSCH 410.

Alternatively, in some other implementations, the UE 115 may multiplex the sidelink HARQ-ACK feedback on a later of the high priority PUSCH 405 and the low priority PUSCH 410. For example, and as shown in FIG. 4, if the high priority PUSCH 405 is later than the low priority PUSCH 410, the UE 115 may multiplex the sidelink HARQ-ACK feedback on the high priority PUSCH 405.

Additionally or alternatively, the UE 115 may multiplex the sidelink HARQ-ACK feedback on the PUSCH scheduled by a relatively earlier DCI. For example, if the UE 115 receives a first DCI scheduling an uplink data message over the high priority PUSCH 405 before a second DCI scheduling an uplink data message over the low priority PUSCH 410, the UE 115 may multiplex the sidelink HARQ-ACK feedback on the high priority PUSCH 405 based on the first DCI being the earlier DCI. Alternatively, the UE 115 may multiplex the sidelink HARQ-ACK feedback on the PUSCH scheduled by a relatively later DCI. For example, if the UE 115 receives the first DCI scheduling the uplink data message over the high priority PUSCH 405 before the second DCI scheduling the uplink data message over the low priority PUSCH 410, the UE 115 may multiplex the sidelink HARQ-ACK feedback on the low priority PUSCH 410 based on the second DCI being the later DCI.

Additionally or alternatively, the DCI or configuration signaling providing (e.g., allocating) the PUCCH 415 (e.g., the PUCCH resource) for the sidelink HARQ-ACK feedback may also indicate whether the sidelink HARQ-ACK feedback can be multiplexed on the high priority PUSCH 405 or the low priority PUSCH 410 if such a scenario of overlapping over both the high priority PUSCH 405 and the low priority PUSCH 410 occurs. For example, if the DCI or configuration signaling providing the PUCCH 415 indicates that the sidelink HARQ-ACK feedback can be multiplexed on the low priority PUSCH 410 in scenarios in which the PUCCH 415 overlaps with both the high priority PUSCH 405 and the low priority PUSCH 410, the UE 115 may multiplex the sidelink HARQ-ACK feedback on the low priority PUSCH 410.

Additionally or alternatively, the UE 115 may multiplex the sidelink HARQ-ACK feedback on the PUSCH that is on a same cell or a same carrier as the PUCCH 415 (e.g., the PUCCH resource). For example, if the high priority PUSCH 405 and the PUCCH 415 are on a first cell or carrier and the low priority PUSCH 410 is on a second cell or carrier, the UE 115 may multiplex the sidelink HARQ-ACK feedback on the high priority PUSCH 405.

In some aspects, the base station 105 may signal one or more of such multiplexing rules or procedures to the UE 115 and the signaling may be dynamic, static, or semi-static. For example, the base station 105 may indicate one or more of such multiplexing rules or procedures via DCI or RRC signaling. As such, a behavior of the UE following in accordance with one or more of the multiplexing rules may be configured or pre-configured (e.g., preloaded) at the UE 115. Further, although FIG. 4 illustrates one example overlapping of the PUSCH 405 and the PUSCH 410 with the PUCCH 415, the PUCCH 415 may partially or completely overlap with the PUSCH 405 and the PUSCH 410 in time in any other manner. For example, the PUCCH 415 may partially or completely overlap with the PUSCH 405 and the PUSCH 410 in time and be separate in frequency or may overlap with the PUSCH 405 and the PUSCH 410 in both time and in frequency. Further, although the low priority PUSCH 410 is shown as being before the high priority PUSCH 405, the high priority PUSCH 405 may be before the low priority PUSCH 410.

Figure 5:
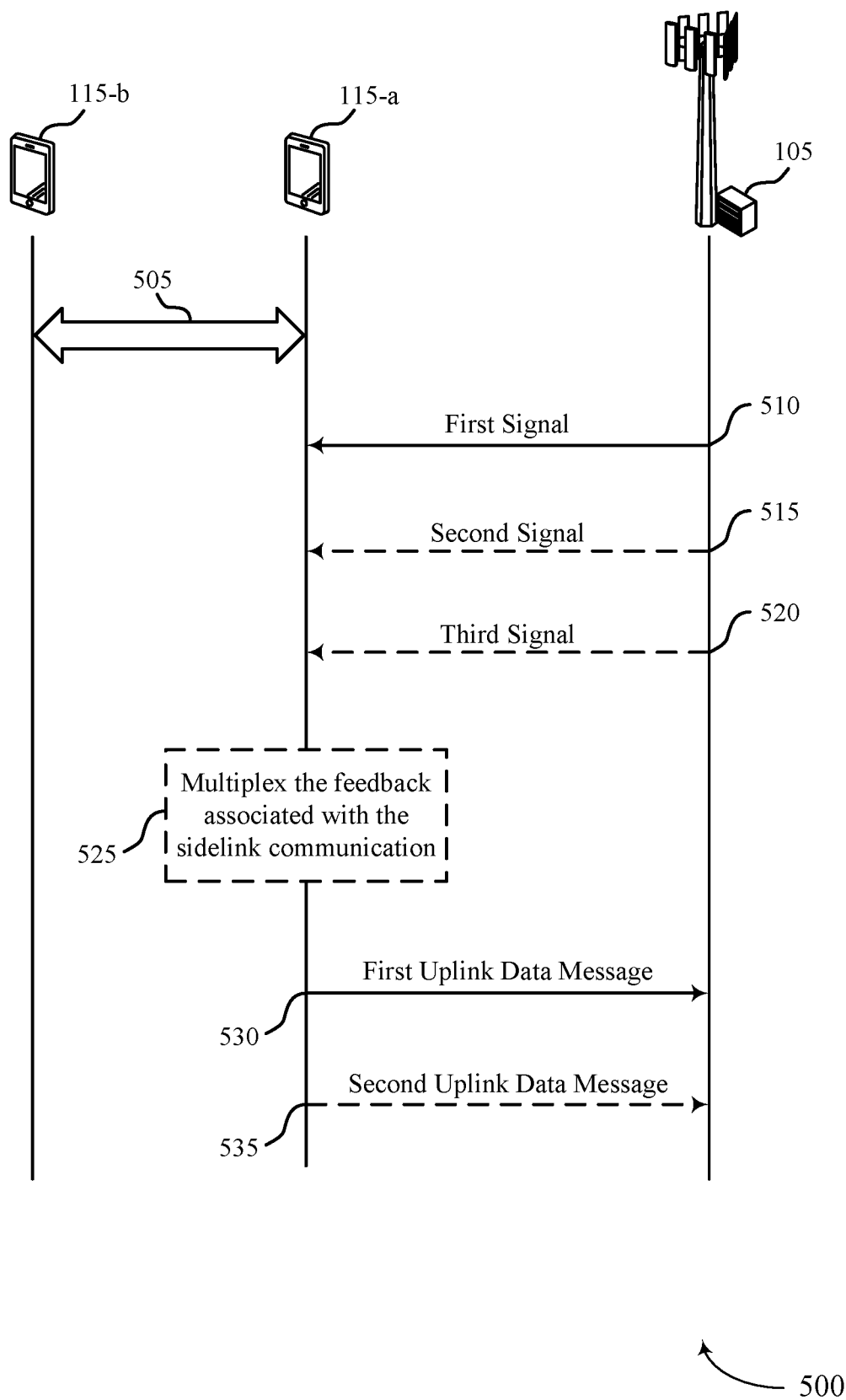
FIG. 5 illustrates an example of a process flow that supports techniques for multiplexing sidelink feedback on a high priority PUSCH in accordance with aspects of the present disclosure.

FIG. 5 illustrates an example of a process flow 500 that supports techniques for multiplexing sidelink feedback on a high priority PUSCH in accordance with aspects of the present disclosure. The process flow 500 may implement or be implemented to realize aspects of the wireless communications system 100 or the signaling diagram 200. For example, the process flow 500 illustrates communication between a UE 115-a, a UE 115-b, and a base station 105, which may be examples of corresponding devices described herein, including with reference to FIGS. 1 and 2. In some examples, the UE 115-a may receive signaling from the base station 105 indicating whether the UE 115-a is to multiplex feedback associated with sidelink communication with an uplink data message on a high priority PUSCH resource in scenarios in which a PUCCH resource over which the UE 115-a is originally scheduled to transmit the feedback at least partially overlaps in time with the high priority PUSCH resource.

In the following description of the process flow 500, the operations may be performed (such as reported or provided) in a different order than the order shown, or the operations performed by the example devices may be performed in different orders or at different times. Some operations also may be left out of the process flow 500, or other operations may be added to the process flow 500. Further, although some operations or signaling may be shown to occur at different times for discussion purposes, these operations may actually occur at the same time.

At 505, the UE 115-a may perform sidelink communication with the UE 115-b over a sidelink. In some examples, the UE 115-a may perform the sidelink communication with the UE 115-b in accordance with a sidelink resource allocation Mode 1 according to which the UE 115-a receives a resource grant from the base station 105 for the sidelink communication. In such examples, the UE 115-a, in addition to transmitting or receiving sidelink feedback over a PSFCH to or from the UE 115-b, may receive a grant for a PUCCH resource over which the UE 115-a is to transmit feedback associated with the sidelink communication to the base station 105. As such, the base station 105 may determine whether the sidelink communication between the UE 115-a and the UE 115-b was successful and, if not, may provide another resource grant to one or both of the UE 115-a and the UE 115-b for one or more retransmissions associated with the sidelink communication.

At 510, the UE 115-a may receive, from the base station 105, a first signal that schedules a first uplink data message associated with a first priority index, the first uplink data message at least partially overlapping in time with the PUCCH resource for the feedback associated with the sidelink communication at the UE 115-a. In some examples, the first signal may be an example of DCI or RRC signaling, or both. In some aspects, the first uplink data message may occupy a PUSCH resource associated with the first priority index, where the first priority index refers to a priority index of 1 and the PUSCH resource is a high priority PUSCH resource.

At 515, the UE 115-a may obtain a second signal at indicates whether the feedback associated with the sidelink communication can be multiplexed with the first uplink data message. In some examples, the UE 115-a may obtain the second signal based on receiving the second signal from the base station 105 (e.g., over the air). In such examples, the second signal may be an example of DCI or RRC signaling, or both. In some implementations, the second signal may include an indication of a parameter that (indirectly) indicates whether the feedback associated with the sidelink communication can be (e.g., is able to be if the base station 105 schedules an overlapping PUSCH) multiplexed with the first uplink data message. Additionally or alternatively, the second signal may include a control signal that allocates the PUCCH resource for the feedback associated with the sidelink communication and the control signal may (explicitly) indicate whether the feedback associated with the sidelink communication can be (e.g., is able to be if the base station 105 schedules an overlapping PUSCH) multiplexed with the first uplink data message. Additionally or alternatively, the UE 115-a may obtain the second signal based on reading from a storage medium at the UE 115-a. For example, the UE 115-a may be pre-configured with a rule or procedure indicating whether the feedback associated with the sidelink communication can be multiplexed with the first uplink data message and, in some examples, may read the pre-configured rule or procedure from the storage medium. In such examples, such a pre-configured rule or procedure may be preloaded on the UE 115-a.

At 520, the UE 115-a may, in some implementations, receive a third signal from the base station 105 scheduling a second uplink data message associated with a second priority index. In some examples, the second priority index may have a lower priority index than the first priority index and the PUCCH resource may at least partially overlap in time with both the first uplink data message and the second uplink data message. In some examples, the third signal may be an example of DCI or RRC signaling, or both. In some aspects, the second uplink data message may occupy a PUSCH resource associated with the second priority index, where the second priority index refers to a priority index 0 and the PUSCH resource is a low priority PUSCH resource.

At 525, the UE 115-a may, in some implementations, multiplex the feedback associated with the sidelink communication. For example, the UE 115-a may multiplex the feedback associated with the sidelink communication with the first uplink data message if the second signal indicates that the UE 115-a is able to multiplex the feedback associated with the sidelink communication with the first uplink data message. Further, in scenarios in which the PUCCH resource overlaps with both the first uplink data message and the second uplink data message, the UE 115-a may multiplex the feedback associated with the sidelink communication with one of the first uplink data message or the second uplink data message in accordance with a configured multiplexing rule or procedure. Alternatively, in some examples, the UE 115-a may drop the feedback associated with the sidelink communication if the second signal indicates that the UE 115-a is unable to multiplex the feedback associated with the sidelink communication with the first uplink data message.

At 530, the UE 115-a may transmit, to the base station 105, the first uplink data message in accordance with the second signal. For example, the UE 115-a may transmit the first uplink data message with the feedback associated with the sidelink communication multiplexed with the first uplink data message if the second signal indicates that the UE 115-a is able to multiplex the feedback associated with the sidelink communication with the first uplink data message. For example, instead of transmitting the feedback associated with the sidelink communication over the PUCCH resource, the UE 115-a may transmit the feedback associated with the sidelink communication over the high priority PUSCH resource. Alternatively, if the second signal indicates that the UE 115-a is unable to multiplex the feedback associated with the sidelink communication with the first uplink data message, the UE 115-a may drop the feedback associated with the sidelink communication and may transmit the first uplink data message without the feedback associated with the sidelink communication multiplexed with the first uplink data message.

At 535, the UE 115-a may, in some implementations, transmit the second uplink data message to the base station 105 in accordance with the configured multiplexing rule or procedure. For example, if the UE 115-a receives the third signal at 520 and is able to multiplex the feedback associated with the sidelink communication with either of the first uplink data message or the second uplink data message, the UE 115-a may multiplex the feedback associated with the sidelink communication with one of the first uplink data message or the second uplink data message in accordance with the configured multiplexing rule or procedure and may transmit the first uplink data message and the second uplink data message accordingly.

Figure 6:
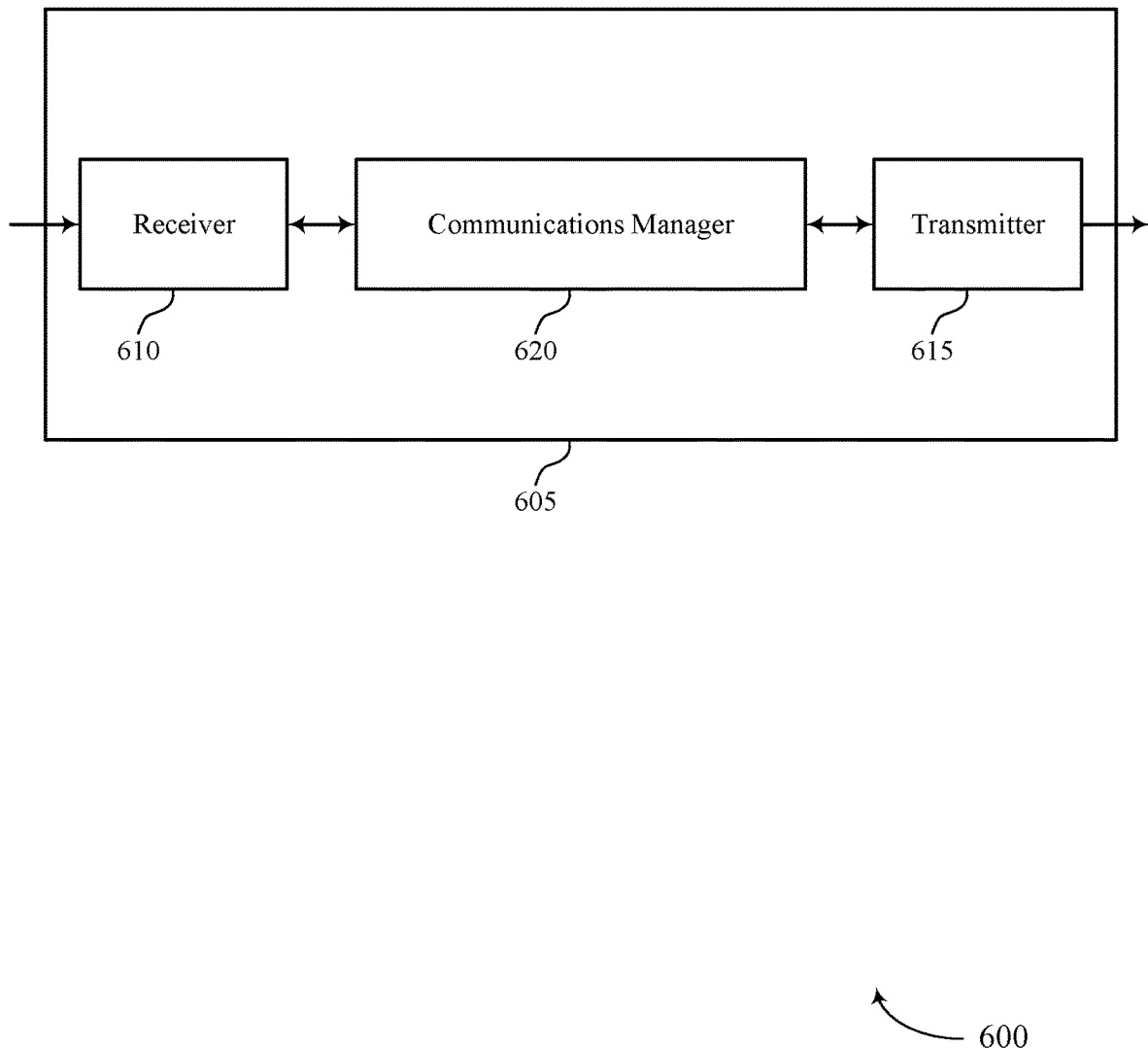
FIGS. 6 and 7 show block diagrams of devices that support techniques for multiplexing sidelink feedback on a high priority PUSCH in accordance with aspects of the present disclosure.

FIG. 6 shows a block diagram 600 of a device 605 that supports techniques for multiplexing sidelink feedback on a high priority PUSCH in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for multiplexing sidelink feedback on a high priority PUSCH). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for multiplexing sidelink feedback on a high priority PUSCH). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for multiplexing sidelink feedback on a high priority PUSCH as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a base station, a first signal that schedules a first uplink data message associated with a first priority index, the first uplink data message at least partially overlapping in time with an uplink control channel resource for feedback associated with sidelink communication at the UE. The communications manager 620 may be configured as or otherwise support a means for obtaining a second signal that indicates whether the feedback associated with the sidelink communication can be multiplexed with the first uplink data message. The communications manager 620 may be configured as or otherwise support a means for transmitting, to the base station, the first uplink data message in accordance with the second signal.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, and more efficient utilization of communication resources.

Figure 7:
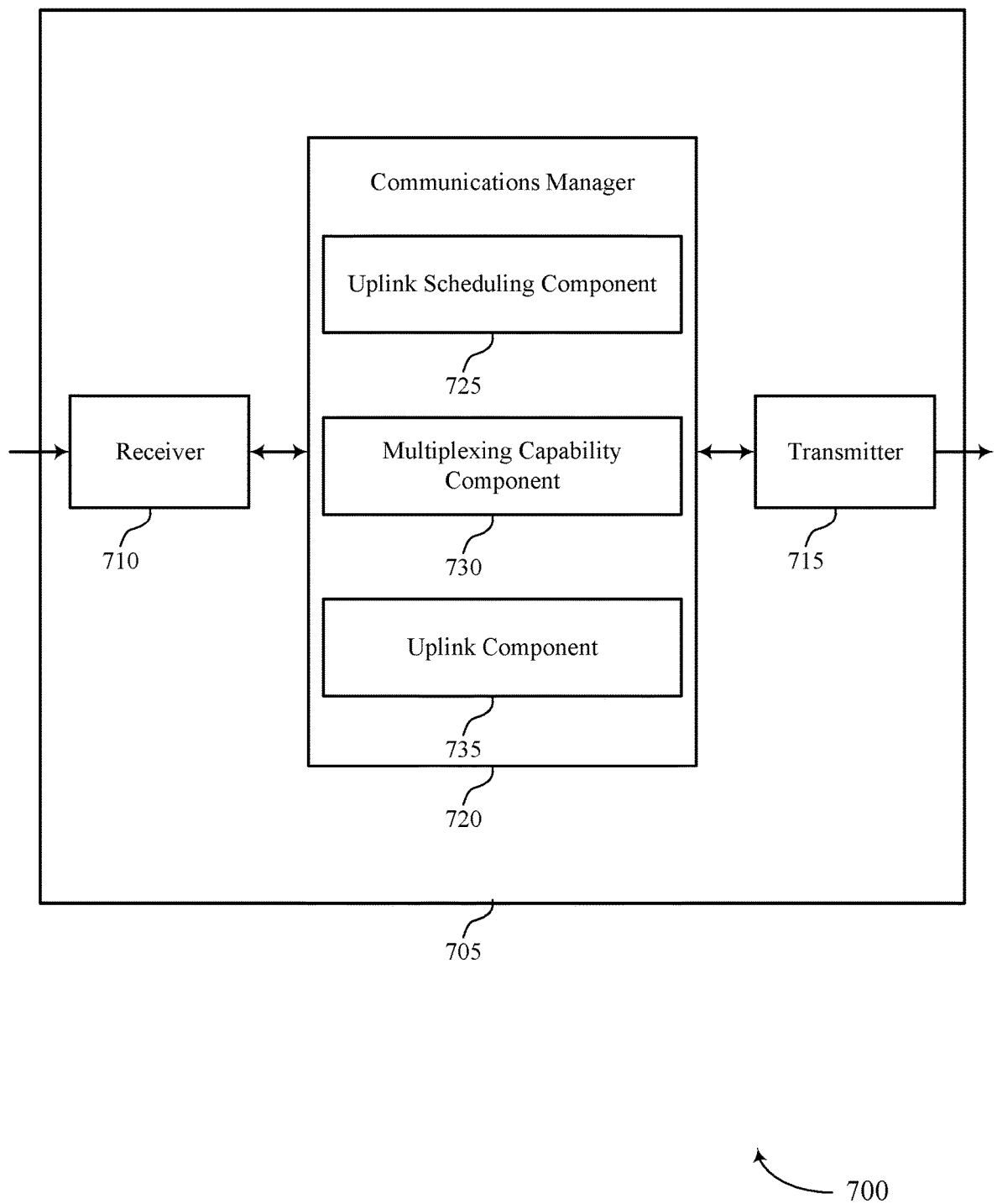

FIG. 7 shows a block diagram 700 of a device 705 that supports techniques for multiplexing sidelink feedback on a high priority PUSCH in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for multiplexing sidelink feedback on a high priority PUSCH). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for multiplexing sidelink feedback on a high priority PUSCH). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for multiplexing sidelink feedback on a high priority PUSCH as described herein. For example, the communications manager 720 may include an uplink scheduling component 725, a multiplexing capability component 730, an uplink component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The uplink scheduling component 725 may be configured as or otherwise support a means for receiving, from a base station, a first signal that schedules a first uplink data message associated with a first priority index, the first uplink data message at least partially overlapping in time with an uplink control channel resource for feedback associated with sidelink communication at the UE. The multiplexing capability component 730 may be configured as or otherwise support a means for obtaining a second signal that indicates whether the feedback associated with the sidelink communication can be multiplexed with the first uplink data message. The uplink component 735 may be configured as or otherwise support a means for transmitting, to the base station, the first uplink data message in accordance with the second signal.

Figure 8:
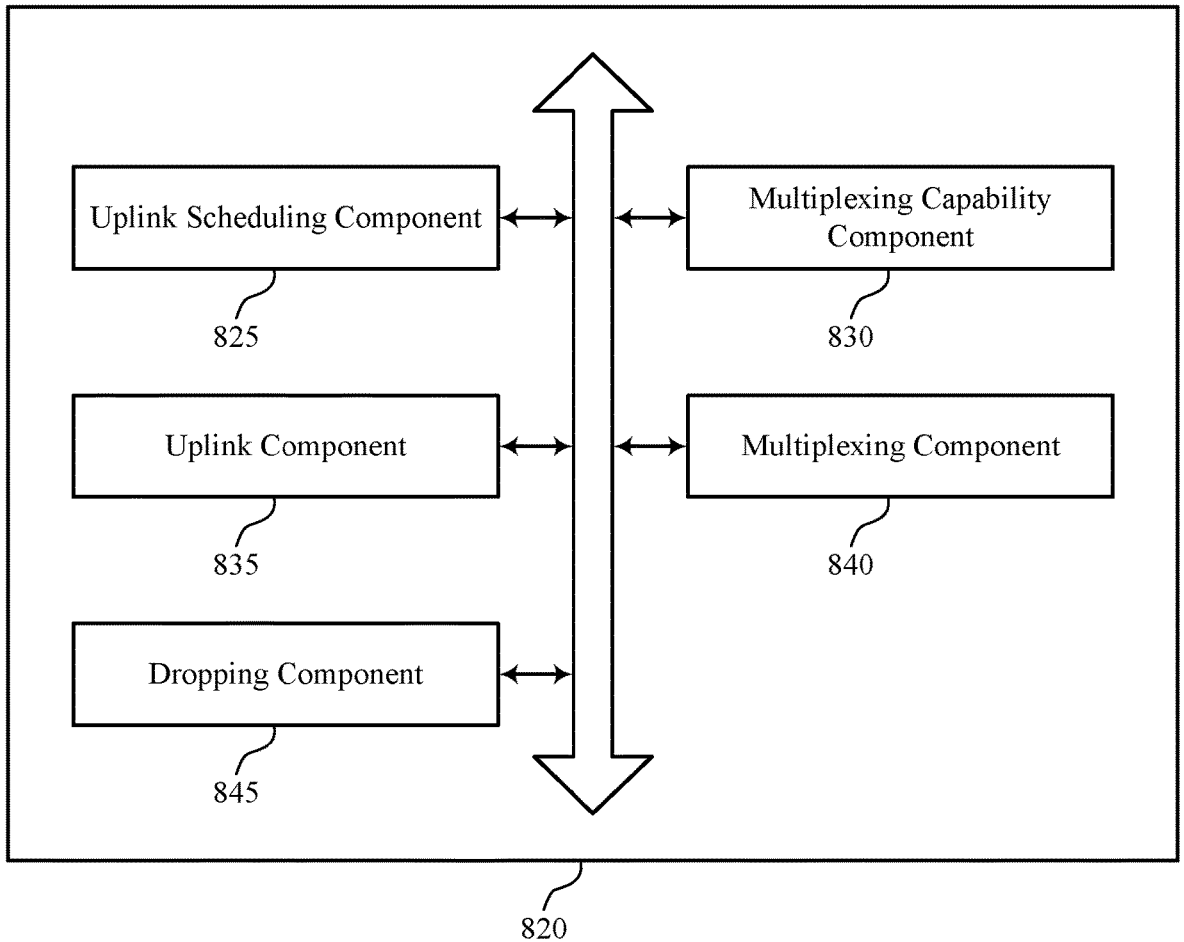
FIG. 8 shows a block diagram of a communications manager that supports techniques for multiplexing sidelink feedback on a high priority PUSCH in accordance with aspects of the present disclosure.

FIG. 8 shows a block diagram 800 of a communications manager 820 that supports techniques for multiplexing sidelink feedback on a high priority PUSCH in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for multiplexing sidelink feedback on a high priority PUSCH as described herein. For example, the communications manager 820 may include an uplink scheduling component 825, a multiplexing capability component 830, an uplink component 835, a multiplexing component 840, a dropping component 845, or any combination thereof. Each of these components may communicate, directly or indirectly, with one another (e.g., via one or more buses).

The communications manager 820 may support wireless communication at a UE in accordance with examples as disclosed herein. The uplink scheduling component 825 may be configured as or otherwise support a means for receiving, from a base station, a first signal that schedules a first uplink data message associated with a first priority index, the first uplink data message at least partially overlapping in time with an uplink control channel resource for feedback associated with sidelink communication at the UE. The multiplexing capability component 830 may be configured as or otherwise support a means for obtaining a second signal that indicates whether the feedback associated with the sidelink communication can be multiplexed with the first uplink data message. The uplink component 835 may be configured as or otherwise support a means for transmitting, to the base station, the first uplink data message in accordance with the second signal.

In some examples, to support obtaining the second signal indicating whether the feedback associated with the sidelink communication can be multiplexed with the first uplink data message, the multiplexing capability component 830 may be configured as or otherwise support a means for obtaining an indication of a parameter, where transmitting the first uplink data message is based on whether a value of the parameter satisfies a threshold value.

In some examples, the multiplexing component 840 may be configured as or otherwise support a means for multiplexing the feedback associated with the sidelink communication with the first uplink data message based on the value of the parameter satisfying the threshold value, where transmitting the first uplink data message is based on multiplexing the feedback associated with the sidelink communication with the first uplink data message.

In some examples, the dropping component 845 may be configured as or otherwise support a means for dropping the feedback associated with the sidelink communication based on the value of the parameter failing to satisfy the threshold value, where transmitting the first uplink data message is based on dropping the feedback associated with the sidelink communication.

In some examples, the UE receives an indication of the threshold value from the base station or the threshold value is standardly configured. In some examples, the threshold value is based on a service type or a latency constraint associated with the UE.

In some examples, to support obtaining the second signal indicating whether the feedback associated with the sidelink communication can be multiplexed with the first uplink data message, the multiplexing capability component 830 may be configured as or otherwise support a means for receiving, from the base station, a control signal allocating the uplink control channel resource for the feedback associated with the sidelink communication, where the control signal indicates whether the feedback associated with the sidelink communication can be multiplexed with the first uplink data message. In some examples, the control signal includes DCI signaling or RRC signaling.

In some examples, obtaining the second signal indicating whether the feedback associated with the sidelink communication can be multiplexed with the first uplink data message includes obtaining an indication that the feedback associated with the sidelink communication can be multiplexed with the first uplink data message. In some examples, receiving, from the base station, a third signal scheduling a second uplink data message associated with a second priority index having a lower priority than the first priority index, where the second uplink data message at least partially overlaps in time with the uplink control channel resource for the feedback associated with the sidelink communication, and where the feedback associated with the sidelink communication can be multiplexed with the second uplink data message. In some examples, transmitting, to the base station, the second uplink data message in accordance with a configured multiplexing procedure.

In some examples, the multiplexing component 840 may be configured as or otherwise support a means for multiplexing the feedback associated with the sidelink communication with one of the first uplink data message or the second uplink data message in accordance with the configured multiplexing procedure and based on the uplink control channel resource for the feedback associated with the sidelink communication overlapping with both the first uplink data message and the second uplink data message.

In some examples, to support multiplexing the feedback associated with the sidelink communication with one of the first uplink data message or the second uplink data message in accordance with the configured multiplexing procedure, the multiplexing component 840 may be configured as or otherwise support a means for multiplexing the feedback associated with the sidelink communication with the second uplink data message based on the second priority index having the lower priority than the first priority index, where transmitting the first uplink data message and the second uplink data message is based on multiplexing the feedback associated with the sidelink communication with the second uplink data message.

In some examples, to support multiplexing the feedback associated with the sidelink communication with one of the first uplink data message or the second uplink data message in accordance with the configured multiplexing procedure, the multiplexing component 840 may be configured as or otherwise support a means for multiplexing the feedback associated with the sidelink communication with the first uplink data message based on the first priority index having a higher priority than the second priority index, where transmitting the first uplink data message and the second uplink data message is based on multiplexing the feedback associated with the sidelink communication with the first uplink data message.

In some examples, to support multiplexing the feedback associated with the sidelink communication with one of the first uplink data message or the second uplink data message in accordance with the configured multiplexing procedure, the multiplexing component 840 may be configured as or otherwise support a means for multiplexing the feedback associated with the sidelink communication with a relatively earlier of the first uplink data message and the second uplink data message, where transmitting the first uplink data message and the second uplink data message is based on multiplexing the feedback associated with the sidelink communication with the relatively earlier of the first uplink data message and the second uplink data message.

In some examples, to support multiplexing the feedback associated with the sidelink communication with one of the first uplink data message or the second uplink data message in accordance with the configured multiplexing procedure, the multiplexing component 840 may be configured as or otherwise support a means for multiplexing the feedback associated with the sidelink communication with a relatively later of the first uplink data message and the second uplink data message, where transmitting the first uplink data message and the second uplink data message is based on multiplexing the feedback associated with the sidelink communication with the relatively later of the first uplink data message and the second uplink data message.

In some examples, to support multiplexing the feedback associated with the sidelink communication with one of the first uplink data message or the second uplink data message in accordance with the configured multiplexing procedure, the multiplexing component 840 may be configured as or otherwise support a means for multiplexing the feedback associated with the sidelink communication with one of the first uplink data message or the second uplink data message based on which of the first uplink data message or the second uplink data message is scheduled by relatively earlier DCI, where transmitting the first uplink data message and the second uplink data message is based on multiplexing the feedback associated with the sidelink communication with the one of the first uplink data message or the second uplink data message that is scheduled by the relatively earlier DCI.

In some examples, to support multiplexing the feedback associated with the sidelink communication with one of the first uplink data message or the second uplink data message in accordance with the configured multiplexing procedure, the multiplexing component 840 may be configured as or otherwise support a means for multiplexing the feedback associated with the sidelink communication with one of the first uplink data message or the second uplink data message based on which of the first uplink data message or the second uplink data message is scheduled by relatively later DCI, where transmitting the first uplink data message and the second uplink data message is based on multiplexing the feedback associated with the sidelink communication with the one of the first uplink data message or the second uplink data message that is scheduled by the relatively later DCI.

In some examples, obtaining the second signal indicating whether the feedback associated with the sidelink communication can be multiplexed with the first uplink data message includes receiving, from the base station, a control signal allocating the uplink control channel resource for the feedback associated with the sidelink communication, where the control signal indicates that the feedback associated with the sidelink communication can be multiplexed with one of the first uplink data message or the second uplink data message. In some examples, multiplexing the feedback associated with the sidelink communication with one of the first uplink data message or the second uplink data message in accordance with the configured multiplexing procedure includes multiplexing the feedback associated with the sidelink communication with which of the first uplink data message or the second uplink data message is indicated by the control signal, where transmitting the first uplink data message and the second uplink data message is based on multiplexing the feedback associated with the sidelink communication with the one of the first uplink data message or the second uplink data message that is indicated by the control signal.

In some examples, to support multiplexing the feedback associated with the sidelink communication with one of the first uplink data message or the second uplink data message in accordance with the configured multiplexing procedure, the multiplexing component 840 may be configured as or otherwise support a means for multiplexing the feedback associated with the sidelink communication with one of the first uplink data message or the second uplink data message based on which of the first uplink data message or the second uplink data message is located on a same cell as the uplink control channel resource, where transmitting the first uplink data message and the second uplink data message is based on multiplexing the feedback associated with the sidelink communication with the one of the first uplink data message or the second uplink data message that is located on the same cell as the uplink control channel resource.

In some examples, the first uplink data message associated with the first priority index occupies a high priority PUSCH. In some examples, the first priority index includes a priority index value 1. In some examples, obtaining the second signal includes receiving the second signal from the base station or reading the second signal from a storage medium of the UE.

Figure 9:
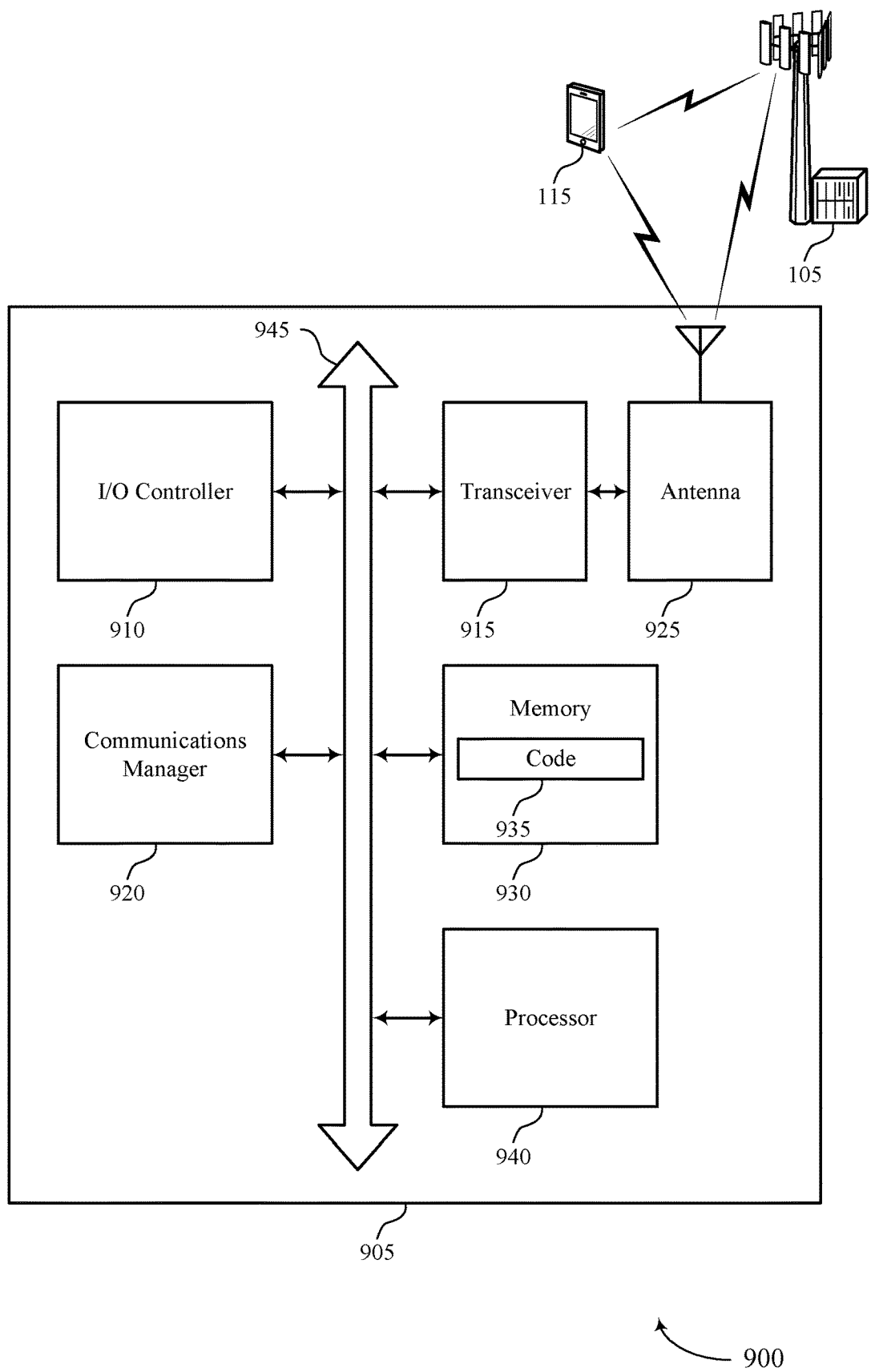
FIG. 9 shows a diagram of a system including a device that supports techniques for multiplexing sidelink feedback on a high priority PUSCH in accordance with aspects of the present disclosure.

FIG. 9 shows a diagram of a system 900 including a device 905 that supports techniques for multiplexing sidelink feedback on a high priority PUSCH in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for multiplexing sidelink feedback on a high priority PUSCH). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a base station, a first signal that schedules a first uplink data message associated with a first priority index, the first uplink data message at least partially overlapping in time with an uplink control channel resource for feedback associated with sidelink communication at the UE. The communications manager 920 may be configured as or otherwise support a means for obtaining a second signal that indicates whether the feedback associated with the sidelink communication can be multiplexed with the first uplink data message. The communications manager 920 may be configured as or otherwise support a means for transmitting, to the base station, the first uplink data message in accordance with the second signal.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for multiplexing sidelink feedback on a high priority PUSCH as described herein, or the processor 940 and the memory 930 may be otherwise configured to perform or support such operations.

Figure 10:
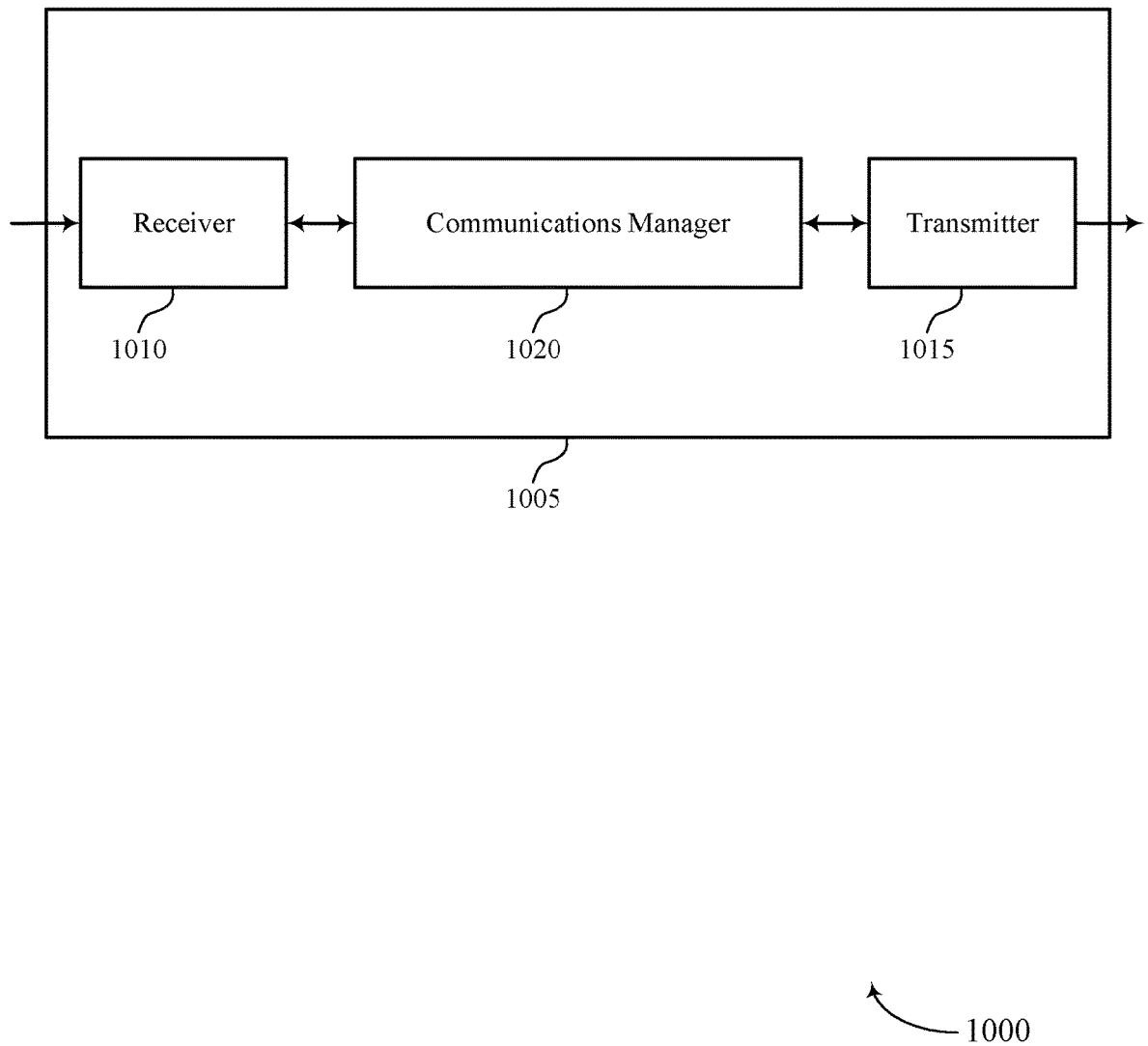
FIGS. 10 and 11 show block diagrams of devices that support techniques for multiplexing sidelink feedback on a high priority PUSCH in accordance with aspects of the present disclosure.

FIG. 10 shows a block diagram 1000 of a device 1005 that supports techniques for multiplexing sidelink feedback on a high priority PUSCH in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for multiplexing sidelink feedback on a high priority PUSCH). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for multiplexing sidelink feedback on a high priority PUSCH). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for multiplexing sidelink feedback on a high priority PUSCH as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a UE, a first signal scheduling a first uplink data message associated with a first priority index, the first uplink data message at least partially overlapping in time with an uplink control channel resource for feedback associated with sidelink communication at the UE. The communications manager 1020 may be configured as or otherwise support a means for transmitting, to the UE, a second signal indicating whether the feedback associated with the sidelink communication can be multiplexed with the first uplink data message. The communications manager 1020 may be configured as or otherwise support a means for receiving, from the UE, the first uplink data message in accordance with the second signal.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing, reduced power consumption, and more efficient utilization of communication resources.

Figure 11:
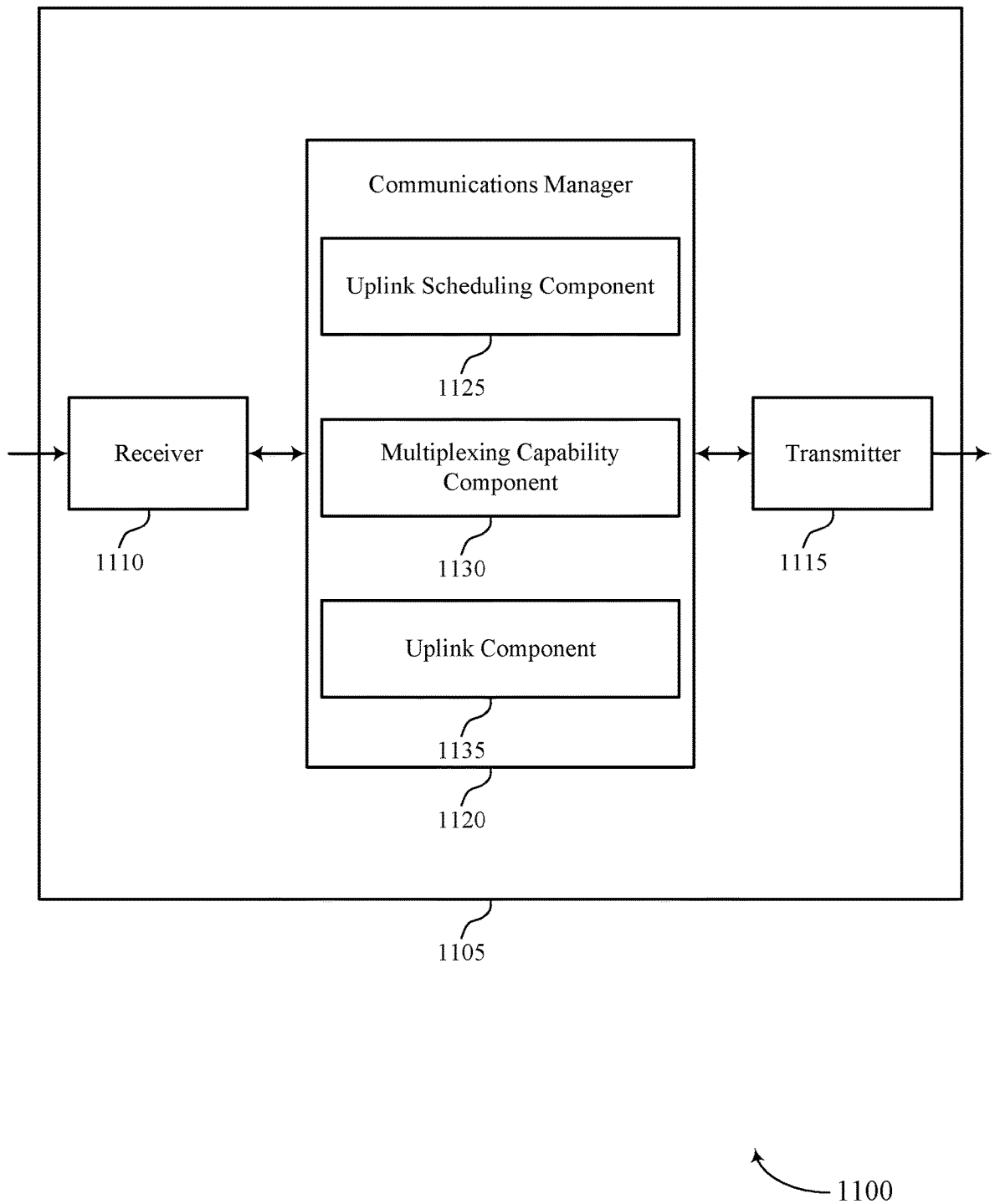

FIG. 11 shows a block diagram 1100 of a device 1105 that supports techniques for multiplexing sidelink feedback on a high priority PUSCH in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for multiplexing sidelink feedback on a high priority PUSCH). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for multiplexing sidelink feedback on a high priority PUSCH). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for multiplexing sidelink feedback on a high priority PUSCH as described herein. For example, the communications manager 1120 may include an uplink scheduling component 1125, a multiplexing capability component 1130, an uplink component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The uplink scheduling component 1125 may be configured as or otherwise support a means for transmitting, to a UE, a first signal scheduling a first uplink data message associated with a first priority index, the first uplink data message at least partially overlapping in time with an uplink control channel resource for feedback associated with sidelink communication at the UE. The multiplexing capability component 1130 may be configured as or otherwise support a means for transmitting, to the UE, a second signal indicating whether the feedback associated with the sidelink communication can be multiplexed with the first uplink data message. The uplink component 1135 may be configured as or otherwise support a means for receiving, from the UE, the first uplink data message in accordance with the second signal.

Figure 12:
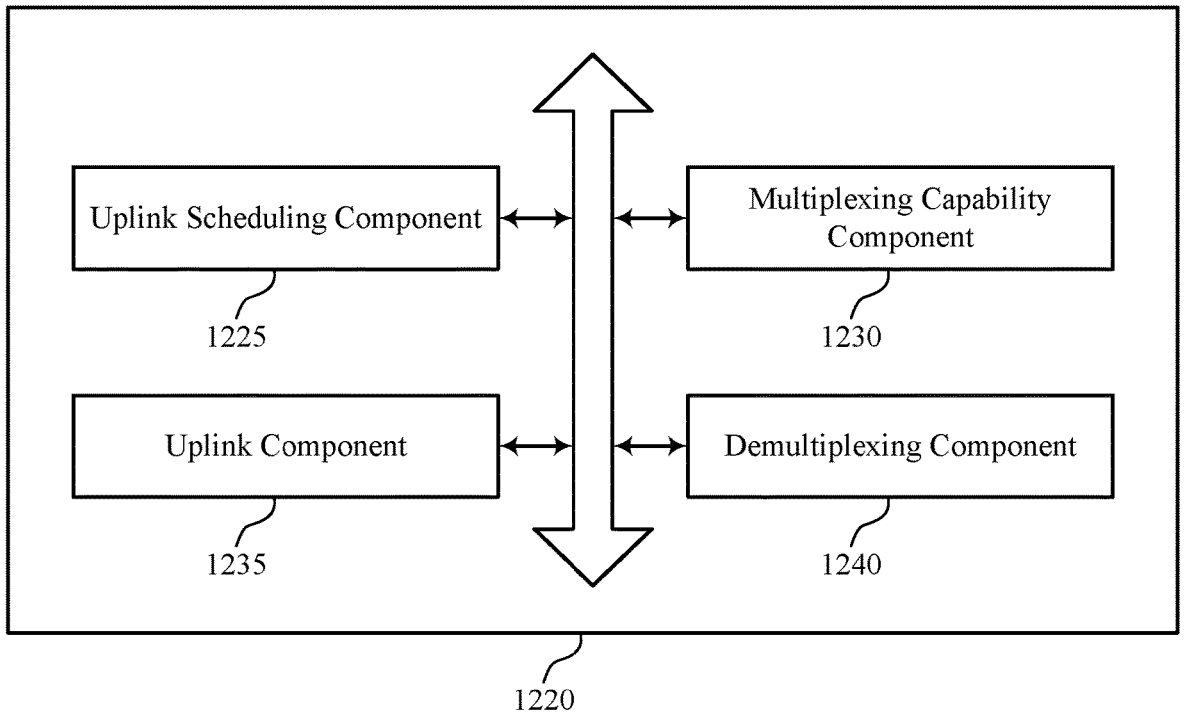
FIG. 12 shows a block diagram of a communications manager that supports techniques for multiplexing sidelink feedback on a high priority PUSCH in accordance with aspects of the present disclosure.

FIG. 12 shows a block diagram 1200 of a communications manager 1220 that supports techniques for multiplexing sidelink feedback on a high priority PUSCH in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for multiplexing sidelink feedback on a high priority PUSCH as described herein. For example, the communications manager 1220 may include an uplink scheduling component 1225, a multiplexing capability component 1230, an uplink component 1235, a demultiplexing component 1240, or any combination thereof. Each of these components may communicate, directly or indirectly, with one another (e.g., via one or more buses).

The communications manager 1220 may support wireless communication at a base station in accordance with examples as disclosed herein. The uplink scheduling component 1225 may be configured as or otherwise support a means for transmitting, to a UE, a first signal scheduling a first uplink data message associated with a first priority index, the first uplink data message at least partially overlapping in time with an uplink control channel resource for feedback associated with sidelink communication at the UE. The multiplexing capability component 1230 may be configured as or otherwise support a means for transmitting, to the UE, a second signal indicating whether the feedback associated with the sidelink communication can be multiplexed with the first uplink data message. The uplink component 1235 may be configured as or otherwise support a means for receiving, from the UE, the first uplink data message in accordance with the second signal.

In some examples, to support transmitting the second signal indicating whether the feedback associated with the sidelink communication can be multiplexed with the first uplink data message, the multiplexing capability component 1230 may be configured as or otherwise support a means for transmitting an indication of a parameter, where receiving the first uplink data message is based on whether a value of the parameter satisfies a threshold value.

In some examples, to support receiving the first uplink data message, the uplink component 1235 may be configured as or otherwise support a means for receiving the first uplink data message with the feedback associated with the sidelink communication multiplexed with the first uplink data message based on the value of the parameter satisfying the threshold value.

In some examples, to support receiving the first uplink data message, the uplink component 1235 may be configured as or otherwise support a means for receiving the first uplink data message without the feedback associated with the sidelink communication multiplexed with the first uplink data message based on the value of the parameter failing to satisfy the threshold value.

In some examples, the base station transmits an indication of the threshold value to the UE or the threshold value is standardly configured. In some examples, the threshold value is based on a service type or a latency constraint associated with the UE.

In some examples, to support transmitting the second signal indicating whether the feedback associated with the sidelink communication can be multiplexed with the first uplink data message, the multiplexing capability component 1230 may be configured as or otherwise support a means for transmitting a control signal allocating the uplink control channel resource for the feedback associated with the sidelink communication, where the control signal indicates whether the feedback associated with the sidelink communication can be multiplexed with the first uplink data message. In some examples, the control signal includes DCI signaling or RRC signaling.

In some examples, transmitting the second signal indicating whether the feedback associated with the sidelink communication can be multiplexed with the first uplink data message includes transmitting an indication that the feedback associated with the sidelink communication can be multiplexed with the first uplink data message. In some examples, transmitting, to the UE, a third signal scheduling a second uplink data message associated with a second priority index having a lower priority than the first priority index, where the second uplink data message at least partially overlaps in time with the uplink control channel resource for the feedback associated with the sidelink communication, and where the feedback associated with the sidelink communication can be multiplexed with the second uplink data message. In some examples, receiving, from the UE, the second uplink data message in accordance with a configured multiplexing procedure.

In some examples, the demultiplexing component 1240 may be configured as or otherwise support a means for demultiplexing the feedback associated with the sidelink communication from one of the first uplink data message or the second uplink data message in accordance with the configured multiplexing procedure and based on the uplink control channel resource for the feedback associated with the sidelink communication overlapping with both the first uplink data message and the second uplink data message.

In some examples, to support demultiplexing the feedback associated with the sidelink communication from one of the first uplink data message or the second uplink data message in accordance with the configured multiplexing procedure, the demultiplexing component 1240 may be configured as or otherwise support a means for demultiplexing the feedback associated with the sidelink communication from the second uplink data message based on the second priority index having the lower priority than the first priority index.

In some examples, to support demultiplexing the feedback associated with the sidelink communication from one of the first uplink data message or the second uplink data message in accordance with the configured multiplexing procedure, the demultiplexing component 1240 may be configured as or otherwise support a means for demultiplexing the feedback associated with the sidelink communication from the first uplink data message based on the first priority index having a higher priority than the second priority index.

In some examples, to support demultiplexing the feedback associated with the sidelink communication from one of the first uplink data message or the second uplink data message in accordance with the configured multiplexing procedure, the demultiplexing component 1240 may be configured as or otherwise support a means for demultiplexing the feedback associated with the sidelink communication from a relatively earlier of the first uplink data message and the second uplink data message.

In some examples, to support demultiplexing the feedback associated with the sidelink communication from one of the first uplink data message or the second uplink data message in accordance with the configured multiplexing procedure, the demultiplexing component 1240 may be configured as or otherwise support a means for demultiplexing the feedback associated with the sidelink communication from a relatively later of the first uplink data message and the second uplink data message.

In some examples, to support demultiplexing the feedback associated with the sidelink communication from one of the first uplink data message or the second uplink data message in accordance with the configured multiplexing procedure, the demultiplexing component 1240 may be configured as or otherwise support a means for demultiplexing the feedback associated with the sidelink communication from one of the first uplink data message or the second uplink data message based on which of the first uplink data message or the second uplink data message is scheduled by relatively earlier DCI.

In some examples, to support demultiplexing the feedback associated with the sidelink communication from one of the first uplink data message or the second uplink data message in accordance with the configured multiplexing procedure, the demultiplexing component 1240 may be configured as or otherwise support a means for demultiplexing the feedback associated with the sidelink communication from one of the first uplink data message or the second uplink data message based on which of the first uplink data message or the second uplink data message is scheduled by relatively later DCI.

In some examples, transmitting the second signal indicating whether the feedback associated with the sidelink communication can be multiplexed with the first uplink data message includes transmitting a control signal allocating the uplink control channel resource for the feedback associated with the sidelink communication, where the control signal indicates that the feedback associated with the sidelink communication can be multiplexed with one of the first uplink data message or the second uplink data message. In some examples, demultiplexing the feedback associated with the sidelink communication from one of the first uplink data message or the second uplink data message in accordance with the configured multiplexing procedure includes demultiplexing the feedback associated with the sidelink communication from which of the first uplink data message or the second uplink data message is indicated by the control signal.

In some examples, to support demultiplexing the feedback associated with the sidelink communication from one of the first uplink data message or the second uplink data message in accordance with the configured multiplexing procedure, the demultiplexing component 1240 may be configured as or otherwise support a means for demultiplexing the feedback associated with the sidelink communication from one of the first uplink data message or the second uplink data message based on which of the first uplink data message or the second uplink data message is located on a same cell as the uplink control channel resource.

In some examples, the first uplink data message associated with the first priority index occupies a high priority PUSCH. In some examples, the first priority index includes a priority index value 1.

Figure 13:
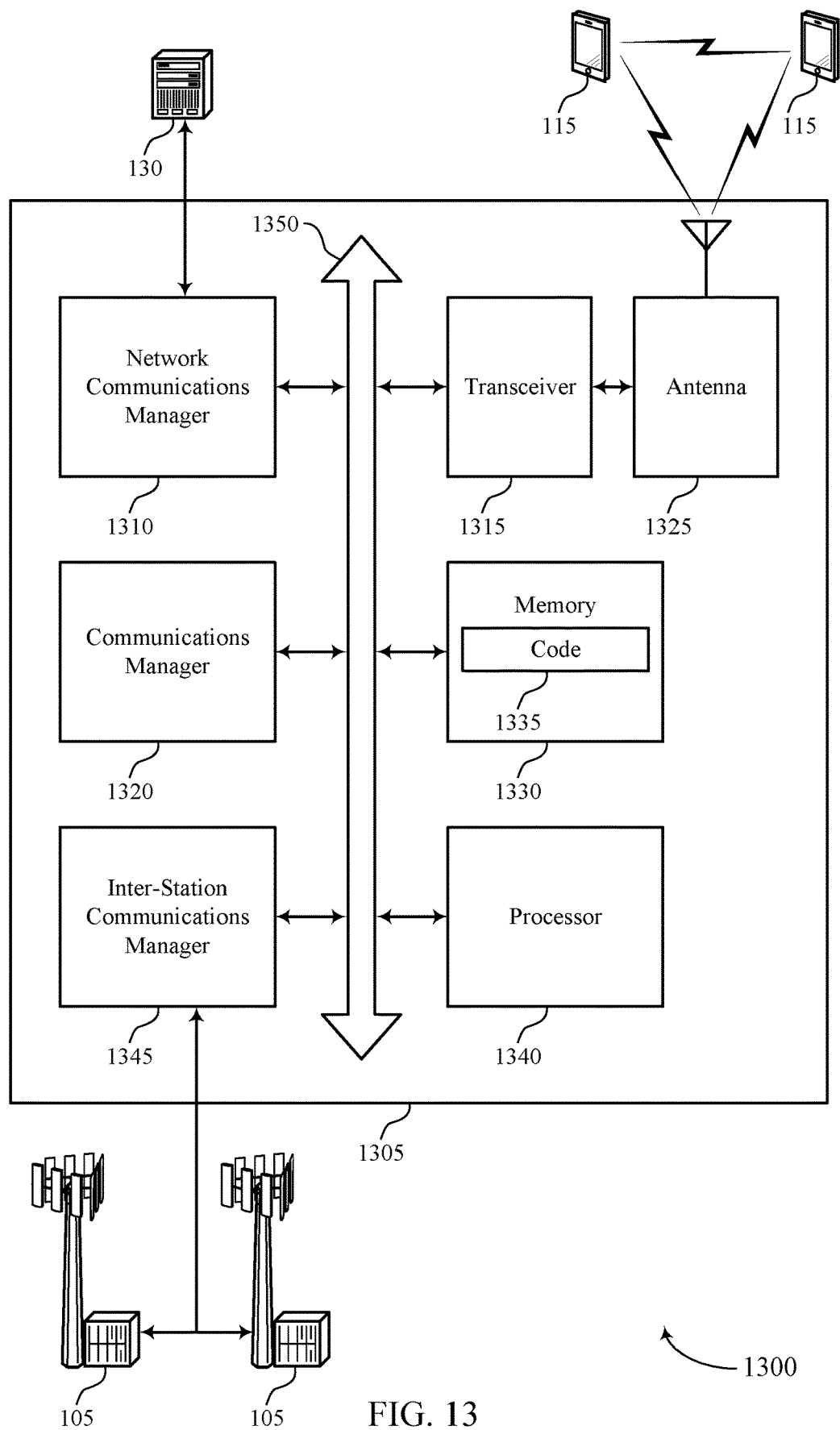
FIG. 13 shows a diagram of a system including a device that supports techniques for multiplexing sidelink feedback on a high priority PUSCH in accordance with aspects of the present disclosure.

FIG. 13 shows a diagram of a system 1300 including a device 1305 that supports techniques for multiplexing sidelink feedback on a high priority PUSCH in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for multiplexing sidelink feedback on a high priority PUSCH). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a UE, a first signal scheduling a first uplink data message associated with a first priority index, the first uplink data message at least partially overlapping in time with an uplink control channel resource for feedback associated with sidelink communication at the UE. The communications manager 1320 may be configured as or otherwise support a means for transmitting, to the UE, a second signal indicating whether the feedback associated with the sidelink communication can be multiplexed with the first uplink data message. The communications manager 1320 may be configured as or otherwise support a means for receiving, from the UE, the first uplink data message in accordance with the second signal.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for multiplexing sidelink feedback on a high priority PUSCH as described herein, or the processor 1340 and the memory 1330 may be otherwise configured to perform or support such operations.

Figure 14:
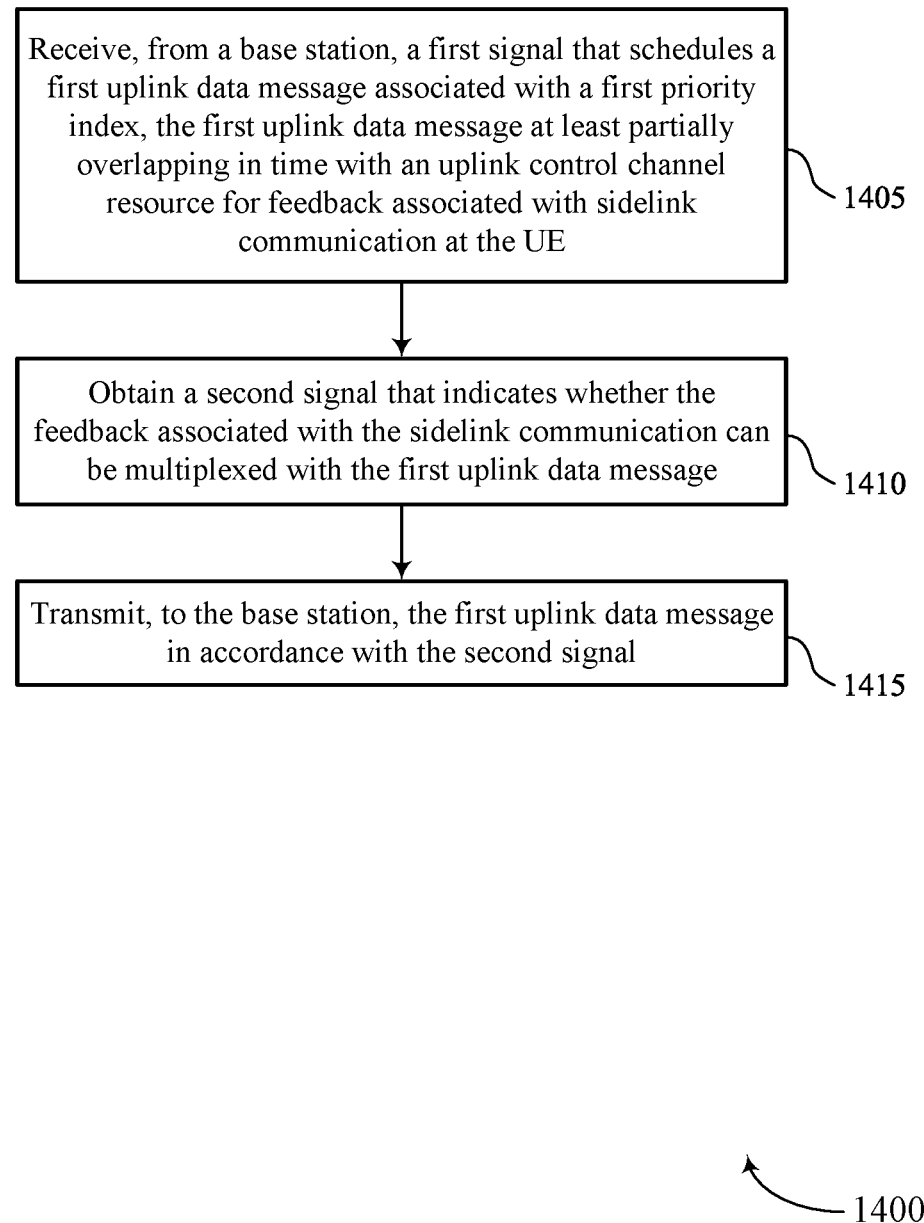
FIGS. 14 and 15 show flowcharts illustrating methods that support techniques for multiplexing sidelink feedback on a high priority PUSCH in accordance with aspects of the present disclosure.

FIG. 14 shows a flowchart illustrating a method 1400 that supports techniques for multiplexing sidelink feedback on a high priority PUSCH in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a first signal that schedules a first uplink data message associated with a first priority index, the first uplink data message at least partially overlapping in time with an uplink control channel resource for feedback associated with sidelink communication at the UE. The operations of 1405 may be performed in accordance with examples as disclosed herein. In some examples, aspects of the operations of 1405 may be performed by an uplink scheduling component 825 as described with reference to FIG. 8.

At 1410, the method may include obtaining a second signal that indicates whether the feedback associated with the sidelink communication can be multiplexed with the first uplink data message. The operations of 1410 may be performed in accordance with examples as disclosed herein. In some examples, aspects of the operations of 1410 may be performed by a multiplexing capability component 830 as described with reference to FIG. 8.

At 1415, the method may include transmitting, to the base station, the first uplink data message in accordance with the second signal. The operations of 1415 may be performed in accordance with examples as disclosed herein. In some examples, aspects of the operations of 1415 may be performed by an uplink component 835 as described with reference to FIG. 8.

Figure 15:
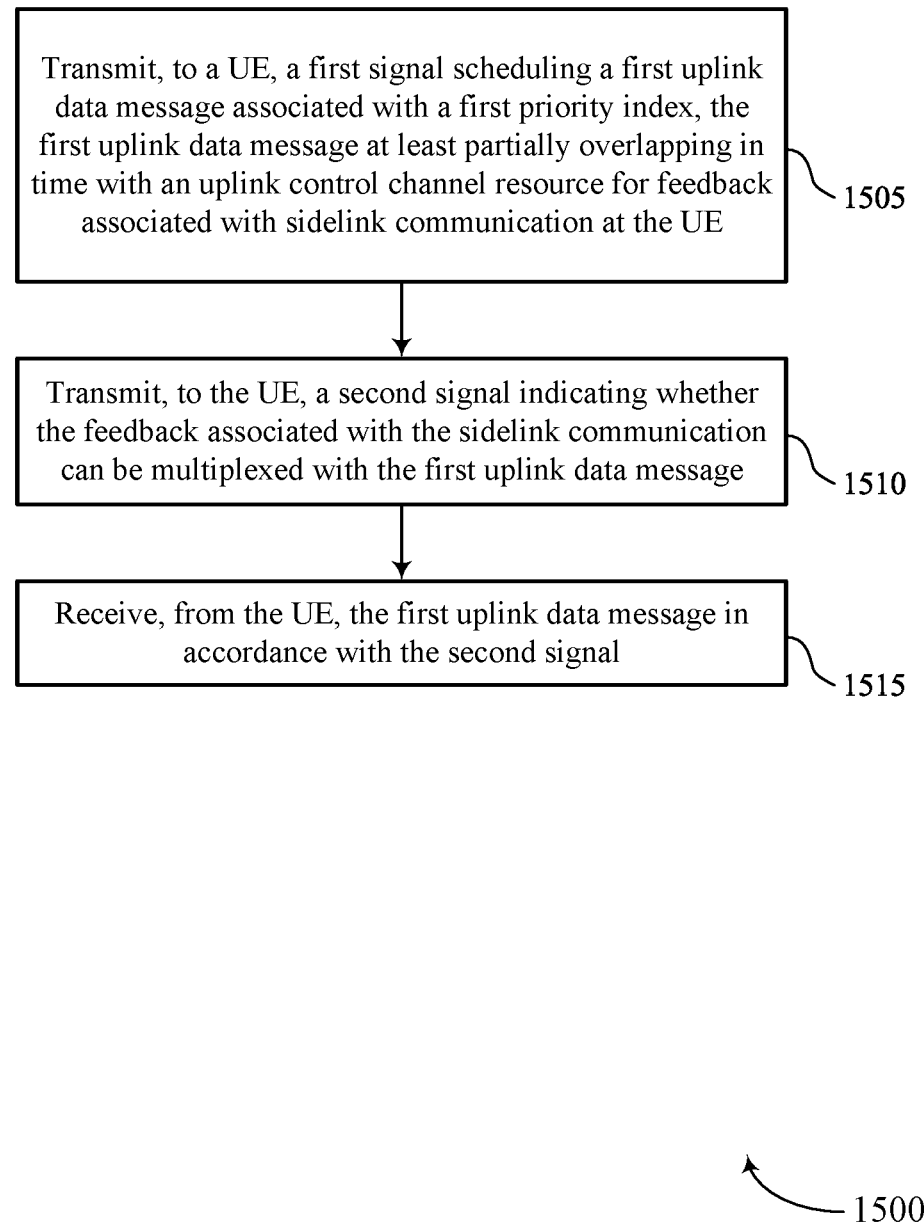

FIG. 15 shows a flowchart illustrating a method 1500 that supports techniques for multiplexing sidelink feedback on a high priority PUSCH in accordance with aspects of the present disclosure. The operations of the method 1500 may be implemented by a base station or its components as described herein. For example, the operations of the method 1500 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, a first signal scheduling a first uplink data message associated with a first priority index, the first uplink data message at least partially overlapping in time with an uplink control channel resource for feedback associated with sidelink communication at the UE. The operations of 1505 may be performed in accordance with examples as disclosed herein. In some examples, aspects of the operations of 1505 may be performed by an uplink scheduling component 1225 as described with reference to FIG. 12.

At 1510, the method may include transmitting, to the UE, a second signal indicating whether the feedback associated with the sidelink communication can be multiplexed with the first uplink data message. The operations of 1510 may be performed in accordance with examples as disclosed herein. In some examples, aspects of the operations of 1510 may be performed by a multiplexing capability component 1230 as described with reference to FIG. 12.

At 1515, the method may include receiving, from the UE, the first uplink data message in accordance with the second signal. The operations of 1515 may be performed in accordance with examples as disclosed herein. In some examples, aspects of the operations of 1515 may be performed by an uplink component 1235 as described with reference to FIG. 12.

The following provides an overview of aspects of the present disclosure:

Aspect 1: A method for wireless communication at a UE, comprising: receiving, from a base station, a first signal that schedules a first uplink data message associated with a first priority index, the first uplink data message at least partially overlapping in time with an uplink control channel resource for feedback associated with sidelink communication at the UE; obtaining a second signal that indicates whether the feedback associated with the sidelink communication can be multiplexed with the first uplink data message; and transmitting, to the base station, the first uplink data message in accordance with the second signal.

Aspect 2: The method of aspect 1, wherein obtaining the second signal indicating whether the feedback associated with the sidelink communication can be multiplexed with the first uplink data message comprises: obtaining an indication of a parameter, wherein transmitting the first uplink data message is based at least in part on whether a value of the parameter satisfies a threshold value.

Aspect 3: The method of aspect 2, further comprising: multiplexing the feedback associated with the sidelink communication with the first uplink data message based at least in part on the value of the parameter satisfying the threshold value, wherein transmitting the first uplink data message is based at least in part on multiplexing the feedback associated with the sidelink communication with the first uplink data message.

Aspect 4: The method of aspect 2, further comprising: dropping the feedback associated with the sidelink communication based at least in part on the value of the parameter failing to satisfy the threshold value, wherein transmitting the first uplink data message is based at least in part on dropping the feedback associated with the sidelink communication.

Aspect 5: The method of any of aspects 2 through 4, wherein the UE receives an indication of the threshold value from the base station or the threshold value is standardly configured.

Aspect 6: The method of any of aspects 2 through 5, wherein the threshold value is based at least in part on a service type or a latency constraint associated with the UE.

Aspect 7: The method of any of aspects 1 through 6, wherein obtaining the second signal indicating whether the feedback associated with the sidelink communication can be multiplexed with the first uplink data message comprises: receiving, from the base station, a control signal allocating the uplink control channel resource for the feedback associated with the sidelink communication, wherein the control signal indicates whether the feedback associated with the sidelink communication can be multiplexed with the first uplink data message.

Aspect 8: The method of aspect 7, wherein the control signal comprises DCI signaling or RRC signaling.

Aspect 9: The method of any of aspects 1 through 8, wherein obtaining the second signal indicating whether the feedback associated with the sidelink communication can be multiplexed with the first uplink data message comprises obtaining an indication that the feedback associated with the sidelink communication can be multiplexed with the first uplink data message, the method further comprising: receiving, from the base station, a third signal scheduling a second uplink data message associated with a second priority index having a lower priority than the first priority index, wherein the second uplink data message at least partially overlaps in time with the uplink control channel resource for the feedback associated with the sidelink communication, and wherein the feedback associated with the sidelink communication can be multiplexed with the second uplink data message; and transmitting, to the base station, the second uplink data message in accordance with a configured multiplexing procedure.

Aspect 10: The method of aspect 9, further comprising: multiplexing the feedback associated with the sidelink communication with one of the first uplink data message or the second uplink data message in accordance with the configured multiplexing procedure and based at least in part on the uplink control channel resource for the feedback associated with the sidelink communication overlapping with both the first uplink data message and the second uplink data message.

Aspect 11: The method of aspect 10, wherein multiplexing the feedback associated with the sidelink communication with one of the first uplink data message or the second uplink data message in accordance with the configured multiplexing procedure comprises: multiplexing the feedback associated with the sidelink communication with the second uplink data message based at least in part on the second priority index having the lower priority than the first priority index, wherein transmitting the first uplink data message and the second uplink data message is based at least in part on multiplexing the feedback associated with the sidelink communication with the second uplink data message.

Aspect 12: The method of aspect 10, wherein multiplexing the feedback associated with the sidelink communication with one of the first uplink data message or the second uplink data message in accordance with the configured multiplexing procedure comprises: multiplexing the feedback associated with the sidelink communication with the first uplink data message based at least in part on the first priority index having a higher priority than the second priority index, wherein transmitting the first uplink data message and the second uplink data message is based at least in part on multiplexing the feedback associated with the sidelink communication with the first uplink data message.

Aspect 13: The method of aspect 10, wherein multiplexing the feedback associated with the sidelink communication with one of the first uplink data message or the second uplink data message in accordance with the configured multiplexing procedure comprises: multiplexing the feedback associated with the sidelink communication with a relatively earlier of the first uplink data message and the second uplink data message, wherein transmitting the first uplink data message and the second uplink data message is based at least in part on multiplexing the feedback associated with the sidelink communication with the relatively earlier of the first uplink data message and the second uplink data message.

Aspect 14: The method of aspect 10, wherein multiplexing the feedback associated with the sidelink communication with one of the first uplink data message or the second uplink data message in accordance with the configured multiplexing procedure comprises: multiplexing the feedback associated with the sidelink communication with a relatively later of the first uplink data message and the second uplink data message, wherein transmitting the first uplink data message and the second uplink data message is based at least in part on multiplexing the feedback associated with the sidelink communication with the relatively later of the first uplink data message and the second uplink data message.

Aspect 15: The method of aspect 10, wherein multiplexing the feedback associated with the sidelink communication with one of the first uplink data message or the second uplink data message in accordance with the configured multiplexing procedure comprises: multiplexing the feedback associated with the sidelink communication with one of the first uplink data message or the second uplink data message based at least in part on which of the first uplink data message or the second uplink data message is scheduled by relatively earlier DCI, wherein transmitting the first uplink data message and the second uplink data message is based at least in part on multiplexing the feedback associated with the sidelink communication with the one of the first uplink data message or the second uplink data message that is scheduled by the relatively earlier DCI.

Aspect 16: The method of aspect 10, wherein multiplexing the feedback associated with the sidelink communication with one of the first uplink data message or the second uplink data message in accordance with the configured multiplexing procedure comprises: multiplexing the feedback associated with the sidelink communication with one of the first uplink data message or the second uplink data message based at least in part on which of the first uplink data message or the second uplink data message is scheduled by relatively later DCI, wherein transmitting the first uplink data message and the second uplink data message is based at least in part on multiplexing the feedback associated with the sidelink communication with the one of the first uplink data message or the second uplink data message that is scheduled by the relatively later DCI.

Aspect 17: The method of aspect 10, wherein obtaining the second signal indicating whether the feedback associated with the sidelink communication can be multiplexed with the first uplink data message comprises receiving, from the base station, a control signal allocating the uplink control channel resource for the feedback associated with the sidelink communication, wherein the control signal indicates that the feedback associated with the sidelink communication can be multiplexed with one of the first uplink data message or the second uplink data message; and multiplexing the feedback associated with the sidelink communication with one of the first uplink data message or the second uplink data message in accordance with the configured multiplexing procedure comprises multiplexing the feedback associated with the sidelink communication with which of the first uplink data message or the second uplink data message is indicated by the control signal, wherein transmitting the first uplink data message and the second uplink data message is based at least in part on multiplexing the feedback associated with the sidelink communication with the one of the first uplink data message or the second uplink data message that is indicated by the control signal.

Aspect 18: The method of aspect 10, wherein multiplexing the feedback associated with the sidelink communication with one of the first uplink data message or the second uplink data message in accordance with the configured multiplexing procedure comprises: multiplexing the feedback associated with the sidelink communication with one of the first uplink data message or the second uplink data message based at least in part on which of the first uplink data message or the second uplink data message is located on a same cell as the uplink control channel resource, wherein transmitting the first uplink data message and the second uplink data message is based at least in part on multiplexing the feedback associated with the sidelink communication with the one of the first uplink data message or the second uplink data message that is located on the same cell as the uplink control channel resource.

Aspect 19: The method of any of aspects 1 through 18, wherein the first uplink data message associated with the first priority index occupies a high priority PUSCH, and the first priority index comprises a priority index value 1.

Aspect 20: The method of any of aspects 1 through 19, wherein obtaining the second signal comprises receiving the second signal from the base station or reading the second signal from a storage medium of the UE.

Aspect 21: A method for wireless communication at a base station, further comprising: transmitting, to a UE, a first signal scheduling a first uplink data message associated with a first priority index, the first uplink data message at least partially overlapping in time with an uplink control channel resource for feedback associated with sidelink communication at the UE; transmitting, to the UE, a second signal indicating whether the feedback associated with the sidelink communication can be multiplexed with the first uplink data message; and receiving, from the UE, the first uplink data message in accordance with the second signal.

Aspect 22: The method of aspect 21, wherein transmitting the second signal indicating whether the feedback associated with the sidelink communication can be multiplexed with the first uplink data message comprises: transmitting an indication of a parameter, wherein receiving the first uplink data message is based at least in part on whether a value of the parameter satisfies a threshold value.

Aspect 23: The method of aspect 22, wherein receiving the first uplink data message comprises: receiving the first uplink data message with the feedback associated with the sidelink communication multiplexed with the first uplink data message based at least in part on the value of the parameter satisfying the threshold value.

Aspect 24: The method of aspect 22, wherein receiving the first uplink data message comprises: receiving the first uplink data message without the feedback associated with the sidelink communication multiplexed with the first uplink data message based at least in part on the value of the parameter failing to satisfy the threshold value.

Aspect 25: The method of any of aspects 22 through 24, wherein the base station transmits an indication of the threshold value to the UE or the threshold value is standardly configured.

Aspect 26: The method of any of aspects 22 through 25, wherein the threshold value is based at least in part on a service type or a latency constraint associated with the UE.

Aspect 27: The method of any of aspects 21 through 26, wherein transmitting the second signal indicating whether the feedback associated with the sidelink communication can be multiplexed with the first uplink data message comprises: transmitting a control signal allocating the uplink control channel resource for the feedback associated with the sidelink communication, wherein the control signal indicates whether the feedback associated with the sidelink communication can be multiplexed with the first uplink data message.

Aspect 28: The method of aspect 27, wherein the control signal comprises DCI signaling or RRC signaling.

Aspect 29: The method of any of aspects 21 through 28, wherein transmitting the second signal indicating whether the feedback associated with the sidelink communication can be multiplexed with the first uplink data message comprises transmitting an indication that the feedback associated with the sidelink communication can be multiplexed with the first uplink data message, the method further comprising: transmitting, to the UE, a third signal scheduling a second uplink data message associated with a second priority index having a lower priority than the first priority index, wherein the second uplink data message at least partially overlaps in time with the uplink control channel resource for the feedback associated with the sidelink communication, and wherein the feedback associated with the sidelink communication can be multiplexed with the second uplink data message; and receiving, from the UE, the second uplink data message in accordance with a configured multiplexing procedure.

Aspect 30: The method of aspect 29, further comprising: demultiplexing the feedback associated with the sidelink communication from one of the first uplink data message or the second uplink data message in accordance with the configured multiplexing procedure and based at least in part on the uplink control channel resource for the feedback associated with the sidelink communication overlapping with both the first uplink data message and the second uplink data message.

Aspect 31: The method of aspect 30, wherein demultiplexing the feedback associated with the sidelink communication from one of the first uplink data message or the second uplink data message in accordance with the configured multiplexing procedure comprises: demultiplexing the feedback associated with the sidelink communication from the second uplink data message based at least in part on the second priority index having the lower priority than the first priority index.

Aspect 32: The method of aspect 30, wherein demultiplexing the feedback associated with the sidelink communication from one of the first uplink data message or the second uplink data message in accordance with the configured multiplexing procedure comprises: demultiplexing the feedback associated with the sidelink communication from the first uplink data message based at least in part on the first priority index having a higher priority than the second priority index.

Aspect 33: The method of aspect 30, wherein demultiplexing the feedback associated with the sidelink communication from one of the first uplink data message or the second uplink data message in accordance with the configured multiplexing procedure comprises: demultiplexing the feedback associated with the sidelink communication from a relatively earlier of the first uplink data message and the second uplink data message.

Aspect 34: The method of aspect 30, wherein demultiplexing the feedback associated with the sidelink communication from one of the first uplink data message or the second uplink data message in accordance with the configured multiplexing procedure comprises: demultiplexing the feedback associated with the sidelink communication from a relatively later of the first uplink data message and the second uplink data message.

Aspect 35: The method of aspect 30, wherein demultiplexing the feedback associated with the sidelink communication from one of the first uplink data message or the second uplink data message in accordance with the configured multiplexing procedure comprises: demultiplexing the feedback associated with the sidelink communication from one of the first uplink data message or the second uplink data message based at least in part on which of the first uplink data message or the second uplink data message is scheduled by relatively earlier DCI.

Aspect 36: The method of aspect 30, wherein demultiplexing the feedback associated with the sidelink communication from one of the first uplink data message or the second uplink data message in accordance with the configured multiplexing procedure comprises: demultiplexing the feedback associated with the sidelink communication from one of the first uplink data message or the second uplink data message based at least in part on which of the first uplink data message or the second uplink data message is scheduled by relatively later DCI.

Aspect 37: The method of aspect 30, wherein transmitting the second signal indicating whether the feedback associated with the sidelink communication can be multiplexed with the first uplink data message comprises transmitting a control signal allocating the uplink control channel resource for the feedback associated with the sidelink communication, wherein the control signal indicates that the feedback associated with the sidelink communication can be multiplexed with one of the first uplink data message or the second uplink data message; and demultiplexing the feedback associated with the sidelink communication from one of the first uplink data message or the second uplink data message in accordance with the configured multiplexing procedure comprises demultiplexing the feedback associated with the sidelink communication from which of the first uplink data message or the second uplink data message is indicated by the control signal.

Aspect 38: The method of aspect 30, wherein demultiplexing the feedback associated with the sidelink communication from one of the first uplink data message or the second uplink data message in accordance with the configured multiplexing procedure comprises: demultiplexing the feedback associated with the sidelink communication from one of the first uplink data message or the second uplink data message based at least in part on which of the first uplink data message or the second uplink data message is located on a same cell as the uplink control channel resource.

Aspect 39: The method of any of aspects 21 through 38, wherein the first uplink data message associated with the first priority index occupies a high priority PUSCH, and the first priority index comprises a priority index value 1.

Aspect 40: An apparatus for wireless communication at a UE, comprising a processor; memory coupled with the processor; and instructions stored in the memory and executable by the processor to cause the apparatus to perform a method of any of aspects 1 through 20.

Aspect 41: An apparatus for wireless communication at a UE, comprising at least one means for performing a method of any of aspects 1 through 20.

Aspect 42: A non-transitory computer-readable medium storing code for wireless communication at a UE, the code comprising instructions executable by a processor to perform a method of any of aspects 1 through 20.

Aspect 43: An apparatus for wireless communication at a base station, comprising a processor; memory coupled with the processor; and instructions stored in the memory and executable by the processor to cause the apparatus to perform a method of any of aspects 21 through 39.

Aspect 44: An apparatus for wireless communication at a base station, comprising at least one means for performing a method of any of aspects 21 through 39.

Aspect 45: A non-transitory computer-readable medium storing code for wireless communication at a base station, the code comprising instructions executable by a processor to perform a method of any of aspects 21 through 39.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more memories that store code; and
   one or more processors coupled with the one or more memories and configured to, in association with executing the code, cause the UE to:
   receive, from a network device, a first signal that schedules a first uplink data message via a physical uplink shared channel associated with a first priority index, the first uplink data message at least partially overlapping in time with an uplink control channel resource for feedback associated with sidelink communication at the UE;

obtain a second signal that indicates whether the feedback associated with the sidelink communication is able to be multiplexed with the first uplink data message in accordance with the physical uplink shared channel being associated with the first priority index; and transmit, to the network device, the first uplink data message in accordance with the second signal indicating whether the feedback associated with the sidelink communication is able to be multiplexed with the first uplink data message.

2. The apparatus of claim 1, wherein, to obtain the second signal indicating whether the feedback associated with the sidelink communication is able to be multiplexed with the first uplink data message, the one or more processors are further configured to cause the UE to:

obtain an indication of a parameter, wherein transmitting the first uplink data message is in accordance with whether a value of the parameter satisfies a threshold value.

3. The apparatus of claim 2, wherein the one or more processors are further configured to cause the UE to:

multiplex the feedback associated with the sidelink communication with the first uplink data message in accordance with the value of the parameter satisfying the threshold value, wherein transmitting the first uplink data message is in accordance with multiplexing the feedback associated with the sidelink communication with the first uplink data message.

4. The apparatus of claim 2, wherein the one or more processors are further configured to cause the UE to:

drop the feedback associated with the sidelink communication in accordance with the value of the parameter failing to satisfy the threshold value, wherein transmitting the first uplink data message is in accordance with dropping the feedback associated with the sidelink communication.

5. The apparatus of claim 2, wherein the UE receives an indication of the threshold value from the network device or the threshold value is standardly configured.

6. The apparatus of claim 2, wherein the threshold value is associated with a service type or a latency constraint associated with the UE.

7. The apparatus of claim 1, wherein, to obtain the second signal indicating whether the feedback associated with the sidelink communication is able to be multiplexed with the first uplink data message, the one or more processors are further configured to cause the UE to:

receive, from the network device, a control signal allocating the uplink control channel resource for the feedback associated with the sidelink communication, wherein the control signal indicates whether the feedback associated with the sidelink communication is able to be multiplexed with the first uplink data message.

8. The apparatus of claim 7, wherein the control signal comprises downlink control information signaling or radio resource control signaling.

9. The apparatus of claim 1, wherein obtaining the second signal indicating whether the feedback associated with the sidelink communication is able to be multiplexed with the first uplink data message comprises obtaining an indication that the feedback associated with the sidelink communication is able to be multiplexed with the first uplink data message, wherein the one or more processors are further configured to cause the UE to:

receive, from the network device, a third signal scheduling a second uplink data message associated with a second priority index having a lower priority than the first priority index, wherein the second uplink data message at least partially overlaps in time with the uplink control channel resource for the feedback associated with the sidelink communication, and wherein the feedback associated with the sidelink communication is able to be multiplexed with the second uplink data message; and transmit, to the network device, the second uplink data message in accordance with a configured multiplexing procedure.

10. The apparatus of claim 9, wherein the one or more processors are further configured to cause the UE to:

multiplex the feedback associated with the sidelink communication with one of the first uplink data message or the second uplink data message in accordance with the configured multiplexing procedure and in accordance with the uplink control channel resource for the feedback associated with the sidelink communication overlapping with both the first uplink data message and the second uplink data message.

11. The apparatus of claim 10, wherein, to multiplex the feedback associated with the sidelink communication with one of the first uplink data message or the second uplink data message in accordance with the configured multiplexing procedure, the one or more processors are further configured to cause the UE to:

multiplex the feedback associated with the sidelink communication with the second uplink data message in accordance with the second priority index having the lower priority than the first priority index, wherein transmitting the first uplink data message and the second uplink data message is in accordance with multiplexing the feedback associated with the sidelink communication with the second uplink data message.

12. The apparatus of claim 10, wherein, to multiplex the feedback associated with the sidelink communication with one of the first uplink data message or the second uplink data message in accordance with the configured multiplexing procedure, the one or more processors are further configured to cause the UE to:

multiplex the feedback associated with the sidelink communication with the first uplink data message in accordance with the first priority index having a higher priority than the second priority index, wherein transmitting the first uplink data message and the second uplink data message is in accordance with multiplexing the feedback associated with the sidelink communication with the first uplink data message.

13. The apparatus of claim 10, wherein, to multiplex the feedback associated with the sidelink communication with one of the first uplink data message or the second uplink data message in accordance with the configured multiplexing procedure, the one or more processors are further configured to cause the UE to:

multiplex the feedback associated with the sidelink communication with a relatively earlier of the first uplink data message and the second uplink data message, wherein transmitting the first uplink data message and the second uplink data message is in accordance with multiplexing the feedback associated with the sidelink communication with the relatively earlier of the first uplink data message and the second uplink data message.

14. The apparatus of claim 10, wherein, to multiplex the feedback associated with the sidelink communication with one of the first uplink data message or the second uplink data message in accordance with the configured multiplexing procedure, the one or more processors are further configured to cause the UE to:
multiplex the feedback associated with the sidelink communication with a relatively later of the first uplink data message and the second uplink data message, wherein transmitting the first uplink data message and the second uplink data message is in accordance with multiplexing the feedback associated with the sidelink communication with the relatively later of the first uplink data message and the second uplink data message.

15. The apparatus of claim 10, wherein, to multiplex the feedback associated with the sidelink communication with one of the first uplink data message or the second uplink data message in accordance with the configured multiplexing procedure, the one or more processors are further configured to cause the UE to:
multiplex the feedback associated with the sidelink communication with one of the first uplink data message or the second uplink data message in accordance with which of the first uplink data message or the second uplink data message is scheduled by relatively earlier downlink control information, wherein transmitting the first uplink data message and the second uplink data message is in accordance with multiplexing the feedback associated with the sidelink communication with the one of the first uplink data message or the second uplink data message that is scheduled by the relatively earlier downlink control information.

16. The apparatus of claim 10, wherein, to multiplex the feedback associated with the sidelink communication with one of the first uplink data message or the second uplink data message in accordance with the configured multiplexing procedure, the one or more processors are further configured to cause the UE to:
multiplex the feedback associated with the sidelink communication with one of the first uplink data message or the second uplink data message in accordance with which of the first uplink data message or the second uplink data message is scheduled by relatively later downlink control information, wherein transmitting the first uplink data message and the second uplink data message is in accordance with multiplexing the feedback associated with the sidelink communication with the one of the first uplink data message or the second uplink data message that is scheduled by the relatively later downlink control information.

17. The apparatus of claim 10, wherein:
to obtain the second signal indicating whether the feedback associated with the sidelink communication is able to be multiplexed with the first uplink data message, the one or more processors are further configured to cause the UE to receive, from the network device, a control signal allocating the uplink control channel resource for the feedback associated with the sidelink communication, wherein the control signal indicates that the feedback associated with the sidelink communication is able to be multiplexed with one of the first uplink data message or the second uplink data message; and
to multiplex the feedback associated with the sidelink communication with one of the first uplink data message or the second uplink data message in accordance with the configured multiplexing procedure, the one or more processors are further configured to cause the UE to multiplex the feedback associated with the sidelink communication with which of the first uplink data message or the second uplink data message is indicated by the control signal, wherein transmitting the first uplink data message and the second uplink data message is in accordance with multiplexing the feedback associated with the sidelink communication with the one of the first uplink data message or the second uplink data message that is indicated by the control signal.

18. The apparatus of claim 10, wherein, to multiplex the feedback associated with the sidelink communication with one of the first uplink data message or the second uplink data message in accordance with the configured multiplexing procedure, the one or more processors are further configured to cause the UE to:
multiplex the feedback associated with the sidelink communication with one of the first uplink data message or the second uplink data message in accordance with which of the first uplink data message or the second uplink data message is located on a same cell as the uplink control channel resource, wherein transmitting the first uplink data message and the second uplink data message is in accordance with multiplexing the feedback associated with the sidelink communication with the one of the first uplink data message or the second uplink data message that is located on the same cell as the uplink control channel resource.

19. The apparatus of claim 1, wherein the physical uplink shared channel associated with the first priority index occupies a high priority physical uplink shared channel, and the first priority index comprises a priority index value 1.

20. The apparatus of claim 1, wherein obtaining the second signal comprises receiving the second signal from the network device or reading the second signal from a storage medium of the UE.

21. An apparatus for wireless communication at a network device, comprising:
one or more memories that store code; and
one or more processors coupled with the one or more memories and configured to, in association with executing the code, cause the network device to:
transmit, to a user equipment (UE), a first signal scheduling a first uplink data message via a physical uplink shared channel associated with a first priority index, the first uplink data message at least partially overlapping in time with an uplink control channel resource for feedback associated with sidelink communication at the UE;
transmit, to the UE, a second signal indicating whether the feedback associated with the sidelink communication is able to be multiplexed with the first uplink data message in accordance with the physical uplink shared channel being associated with the first priority index; and
receive, from the UE, the first uplink data message in accordance with 14 the second signal indicating whether the feedback associated with the sidelink communication is able to be multiplexed with the first uplink data message.

22. The apparatus of claim 21, wherein, to transmit the second signal indicating whether the feedback associated with the sidelink communication is able to be multiplexed with the first uplink data message, the one or more processors further configured to cause the network device to:

transmit an indication of a parameter, wherein receiving the first uplink data message is in accordance with whether a value of the parameter satisfies a threshold value.

23. The apparatus of claim 22, wherein, to receive the first uplink data message, the one or more processors are further configured to cause the network device to:
receive the first uplink data message with the feedback associated with the sidelink communication multiplexed with the first uplink data message in accordance with the value of the parameter satisfying the threshold value.

24. The apparatus of claim 22, wherein, to receive the first uplink data message, the one or more processors are further configured to cause the network device to:
receive the first uplink data message without the feedback associated with the sidelink communication multiplexed with the first uplink data message in accordance with the value of the parameter failing to satisfy the threshold value.

25. The apparatus of claim 22, wherein the network device transmits an indication of the threshold value to the UE or the threshold value is standardly configured.

26. The apparatus of claim 22, wherein the threshold value is associated with a service type or a latency constraint associated with the UE.

27. The apparatus of claim 21, wherein, to transmit the second signal indicating whether the feedback associated with the sidelink communication is able to be multiplexed with the first uplink data message, the one or more processors are further configured to cause the network device to:
transmit a control signal allocating the uplink control channel resource for the feedback associated with the sidelink communication, wherein the control signal indicates whether the feedback associated with the sidelink communication is able to be multiplexed with the first uplink data message.

28. The apparatus of claim 27, wherein the control signal comprises downlink control information signaling or radio resource control signaling.

29. A method for wireless communication at a user equipment (UE), comprising:
receiving, from a network device, a first signal that schedules a first uplink data message via a physical uplink shared channel associated with a first priority index, the first uplink data message at least partially overlapping in time with an uplink control channel resource for feedback associated with sidelink communication at the UE;
obtaining a second signal that indicates whether the feedback associated with the sidelink communication is able to be multiplexed with the first uplink data message in accordance with the physical uplink shared channel being associated with the first priority index; and
transmitting, to the network device, the first uplink data message in accordance with the second signal indicating whether the feedback associated with the sidelink communication is able to be multiplexed with the first uplink data message.

30. A method for wireless communication at a network device, further comprising:
transmitting, to a user equipment (UE), a first signal scheduling a first uplink data message via a physical uplink shared channel associated with a first priority index, the first uplink data message at least partially overlapping in time with an uplink control channel resource for feedback associated with sidelink communication at the UE;
transmitting, to the UE, a second signal indicating whether the feedback associated with the sidelink communication is able to be multiplexed with the first uplink data message in accordance with the physical uplink shared channel being associated with the first priority index; and
receiving, from the UE, the first uplink data message in accordance with the second signal indicating whether the feedback associated with the sidelink communication is able to be multiplexed with the first uplink data message.

* * * * *